(12) United States Patent
Habaguchi et al.

(10) Patent No.: US 7,849,149 B2
(45) Date of Patent: Dec. 7, 2010

(54) METHOD AND SYSTEM FOR CONTROLLING THE EXCHANGE OF VEHICLE RELATED MESSAGES

(75) Inventors: Masayuki Habaguchi, Rolling Hills Estates, CA (US); Hiromitsu Yuhara, Rancho Palos Verdes, CA (US); Tsuneo Ono, Torrance, CA (US); Kazuya Tamura, Rancho Palos Verdes, CA (US); Jamie Marie Clough, Arvada, CO (US); Richard C. Shannon, Canyon Hills, CA (US); Jon Yoshito Okino, Irvine, CA (US); John Albert Gusiff, La Canada, CA (US); Daya Appa, Rancho Palos Verdes, CA (US)

(73) Assignee: Honda Motor Co., Ltd., Tokyo (JP)

( * ) Notice: Subject to any disclaimer, the term of this patent is extended or adjusted under 35 U.S.C. 154(b) by 420 days.

(21) Appl. No.: 11/100,868

(22) Filed: Apr. 6, 2005

(65) Prior Publication Data
US 2005/0271037 A1 Dec. 8, 2005

Related U.S. Application Data

(60) Provisional application No. 60/560,088, filed on Apr. 6, 2004.

(51) Int. Cl.
*G06F 15/16* (2006.01)
(52) U.S. Cl. .................................................. 709/207
(58) Field of Classification Search ................ 709/206, 709/207, 201; 340/426.21
See application file for complete search history.

(56) References Cited

U.S. PATENT DOCUMENTS

| | | | |
|---|---|---|---|
| 3,646,580 A | 2/1972 | Fuller et al. | |
| 4,404,639 A | 9/1983 | McGuire et al. | |
| 4,989,146 A | 1/1991 | Imajo | |

(Continued)

FOREIGN PATENT DOCUMENTS

EP 0973299 1/2000

(Continued)

OTHER PUBLICATIONS

The Application of a Novel Two-Way Mobile Satellite Communications and Vehicle Tracking System to the Transportation Industry, Jacobs et al, Feb. 1999, IEEE Transactions on Vehicular Technology, vol. 40, No. 1, pp. 57-63.

(Continued)

*Primary Examiner*—Asad M Nawaz
*Assistant Examiner*—Jason Recek
(74) *Attorney, Agent, or Firm*—Plumsea Law Group, LLC

(57) ABSTRACT

The present invention comprises a message portal for administering and controlling the exchange of vehicle-related messages between a remote location and a vehicle and a method thereof. In one embodiment, the message portal receives a message from the remote location and determines when the message should be broadcast to a vehicle. The priority of the message is determined by several variables—all which may be updated and/or customized by a user through a user interface. The message portal and method can also automatically relay a vehicle fault message to a remote location, which then analyzes the fault and sends a response message back to the driver.

22 Claims, 27 Drawing Sheets

U.S. PATENT DOCUMENTS

| | | | |
|---|---|---|---|
| 5,157,714 A | 10/1992 | Spicer | |
| 5,173,691 A | 12/1992 | Sumner | |
| 5,182,555 A | 1/1993 | Sumner | |
| 5,359,529 A | 10/1994 | Snider | |
| 5,388,045 A | 2/1995 | Kamiya et al. | |
| 5,420,794 A | 5/1995 | James | |
| 5,442,553 A | 8/1995 | Parrillo | |
| 5,445,347 A | 8/1995 | Ng | |
| 5,506,773 A | 4/1996 | Takaba et al. | |
| 5,508,931 A | 4/1996 | Snider | |
| 5,519,701 A * | 5/1996 | Colmant et al. | 370/412 |
| 5,546,305 A | 8/1996 | Kondo | |
| 5,551,064 A | 8/1996 | Nobbe et al. | |
| 5,563,788 A | 10/1996 | Yoon | |
| 5,590,040 A | 12/1996 | Abe et al. | |
| 5,635,924 A | 6/1997 | Tran et al. | |
| 5,636,245 A | 6/1997 | Ernst et al. | |
| 5,648,768 A | 7/1997 | Bouve | |
| 5,649,300 A | 7/1997 | Snyder et al. | |
| 5,661,787 A | 8/1997 | Pocock | |
| 5,664,948 A | 9/1997 | Dimitriadis et al. | |
| 5,671,195 A | 9/1997 | Lee | |
| 5,682,525 A | 10/1997 | Bouve et al. | |
| 5,696,676 A | 12/1997 | Takaba | |
| 5,699,056 A | 12/1997 | Yoshida | |
| 5,757,645 A | 5/1998 | Schneider et al. | |
| 5,774,827 A | 6/1998 | Smith et al. | |
| 5,802,545 A * | 9/1998 | Coverdill | 701/35 |
| 5,862,510 A | 1/1999 | Saga et al. | |
| 5,864,305 A | 1/1999 | Rosenquist | |
| 5,878,056 A * | 3/1999 | Black et al. | 714/748 |
| 5,892,463 A | 4/1999 | Hikita et al. | |
| 5,926,108 A | 7/1999 | Wicks et al. | |
| 5,931,878 A | 8/1999 | Chapin, Jr. | |
| 5,959,577 A | 9/1999 | Fan et al. | |
| 5,964,811 A | 10/1999 | Ishii et al. | |
| 5,982,298 A | 11/1999 | Lappenbusch et al. | |
| 5,999,882 A | 12/1999 | Simpson et al. | |
| 6,032,046 A | 2/2000 | Nakano | |
| 6,073,007 A | 6/2000 | Doyle | |
| 6,078,865 A | 6/2000 | Koyanagi | |
| 6,085,146 A | 7/2000 | Kuribayashi et al. | |
| 6,111,521 A | 8/2000 | Mulder et al. | |
| 6,169,894 B1 | 1/2001 | McCormick et al. | |
| 6,195,602 B1 | 2/2001 | Hazama et al. | |
| 6,208,935 B1 | 3/2001 | Yamada et al. | |
| 6,212,388 B1 | 4/2001 | Seo | |
| 6,236,330 B1 | 5/2001 | Cohen | |
| 6,240,364 B1 | 5/2001 | Kerner et al. | |
| 6,240,458 B1 * | 5/2001 | Gilbertson | 709/232 |
| 6,243,647 B1 | 6/2001 | Berstis et al. | |
| 6,246,320 B1 | 6/2001 | Monroe | |
| 6,266,607 B1 | 7/2001 | Meis et al. | |
| 6,266,608 B1 | 7/2001 | Pertz | |
| 6,292,723 B1 | 9/2001 | Brogan et al. | |
| 6,297,748 B1 | 10/2001 | Lappenbusch et al. | |
| 6,308,120 B1 | 10/2001 | Good | |
| 6,317,686 B1 | 11/2001 | Ran | |
| 6,329,925 B1 * | 12/2001 | Skiver et al. | 340/815.4 |
| 6,330,499 B1 | 12/2001 | Chou et al. | |
| 6,335,729 B2 | 1/2002 | Nunokawa et al. | |
| 6,339,736 B1 | 1/2002 | Moskowitz et al. | |
| 6,351,709 B2 | 2/2002 | King et al. | |
| 6,356,822 B1 | 3/2002 | Diaz et al. | |
| 6,362,730 B2 | 3/2002 | Razavi et al. | |
| 6,370,454 B1 | 4/2002 | Moore | |
| 6,373,883 B1 | 4/2002 | Sorensen et al. | |
| 6,381,533 B1 * | 4/2002 | Crane et al. | 701/200 |
| 6,389,337 B1 | 5/2002 | Kolls | |
| 6,397,067 B1 | 5/2002 | Tanaka et al. | |
| 6,408,307 B1 | 6/2002 | Semple et al. | |
| 6,421,593 B1 | 7/2002 | Kempen et al. | |
| 6,434,455 B1 | 8/2002 | Snow et al. | |
| 6,438,490 B2 | 8/2002 | Ohta | |
| 6,459,961 B1 | 10/2002 | Obradovich et al. | |
| 6,477,452 B2 | 11/2002 | Good | |
| 6,480,105 B2 | 11/2002 | Edwards | |
| 6,480,145 B1 | 11/2002 | Hasegawa | |
| 6,510,317 B1 | 1/2003 | Marko et al. | |
| 6,522,250 B1 | 2/2003 | Ernst et al. | |
| 6,526,335 B1 | 2/2003 | Treyz et al. | |
| 6,529,143 B2 | 3/2003 | Mikkola et al. | |
| 6,539,269 B1 | 3/2003 | Jarrow et al. | |
| 6,539,302 B1 | 3/2003 | Bender et al. | |
| 6,542,794 B2 | 4/2003 | Obradovich et al. | |
| 6,542,822 B1 | 4/2003 | Froeberg | |
| 6,549,833 B2 | 4/2003 | Katagishi et al. | |
| 6,552,682 B1 | 4/2003 | Fan | |
| 6,553,289 B2 | 4/2003 | Maki et al. | |
| 6,553,290 B1 | 4/2003 | Pillar | |
| 6,553,308 B1 | 4/2003 | Uhlmann et al. | |
| 6,553,313 B1 | 4/2003 | Froeberg | |
| 6,577,934 B2 | 6/2003 | Matsunaga et al. | |
| 6,583,734 B2 | 6/2003 | Bates et al. | |
| 6,587,759 B2 | 7/2003 | Obradovich et al. | |
| 6,587,777 B1 | 7/2003 | St. Pierre | |
| 6,587,787 B1 | 7/2003 | Yokota | |
| 6,590,507 B2 | 7/2003 | Burns | |
| 6,594,576 B2 | 7/2003 | Fan et al. | |
| 6,597,904 B1 | 7/2003 | Neustein | |
| 6,603,405 B2 | 8/2003 | Smith | |
| 6,604,038 B1 | 8/2003 | Leseky et al. | |
| 6,609,004 B1 * | 8/2003 | Morse et al. | 455/456.5 |
| 6,611,201 B1 | 8/2003 | Bishop et al. | |
| 6,611,740 B2 | 8/2003 | Lowrey et al. | |
| 6,611,753 B1 | 8/2003 | Millington | |
| 6,615,130 B2 | 9/2003 | Myr | |
| 6,615,133 B2 | 9/2003 | Boies et al. | |
| 6,615,186 B1 | 9/2003 | Kolls | |
| 6,618,669 B2 | 9/2003 | Ota et al. | |
| 6,633,238 B2 | 10/2003 | Lemelson et al. | |
| 6,636,721 B2 | 10/2003 | Threadgill et al. | |
| 6,647,417 B1 | 11/2003 | Hunter et al. | |
| 6,654,600 B1 | 11/2003 | Pollak et al. | |
| 6,657,558 B2 | 12/2003 | Horita et al. | |
| 6,658,485 B1 * | 12/2003 | Baber et al. | 719/314 |
| 6,662,090 B2 | 12/2003 | Toyama et al. | |
| 6,662,091 B2 | 12/2003 | Wilson et al. | |
| 6,664,922 B1 | 12/2003 | Fan | |
| 6,668,219 B2 | 12/2003 | Hwang et al. | |
| 6,677,854 B2 | 1/2004 | Dix | |
| 6,680,694 B1 | 1/2004 | Knockeart et al. | |
| 6,681,120 B1 | 1/2004 | Kim | |
| 6,691,025 B2 | 2/2004 | Reimer | |
| 6,697,633 B1 | 2/2004 | Dogan et al. | |
| 6,701,231 B1 | 3/2004 | Borugian | |
| 6,701,232 B2 | 3/2004 | Yamaki | |
| 6,707,421 B1 | 3/2004 | Drury et al. | |
| 6,711,398 B1 | 3/2004 | Talaie et al. | |
| 6,714,797 B1 | 3/2004 | Rautila | |
| 6,720,920 B2 * | 4/2004 | Breed et al. | 342/386 |
| 6,721,685 B2 | 4/2004 | Kodama | |
| 6,724,827 B1 | 4/2004 | Patsiokas et al. | |
| 6,730,940 B1 | 5/2004 | Steranka et al. | |
| 6,732,031 B1 | 5/2004 | Lightner et al. | |
| 6,735,416 B1 | 5/2004 | Marko et al. | |
| 6,735,504 B2 | 5/2004 | Katagishi et al. | |
| 6,738,697 B2 | 5/2004 | Breed | |
| 6,741,188 B1 | 5/2004 | Miller et al. | |
| 6,741,834 B1 | 5/2004 | Godwin | |
| 6,748,317 B2 | 6/2004 | Maruyama et al. | |
| 6,754,485 B1 | 6/2004 | Obradovich et al. | |
| 6,754,570 B2 | 6/2004 | Iihoshi et al. | |
| 6,757,712 B1 * | 6/2004 | Bastian et al. | 709/206 |

| | | | | | | |
|---|---|---|---|---|---|---|
| 6,785,551 B1 | 8/2004 | Richard | | 2002/0193923 A1 | 12/2002 | Toyama et al. |
| 6,798,358 B2 | 9/2004 | Joyce et al. | | 2002/0198632 A1* | 12/2002 | Breed et al. ............... 701/1 |
| 6,804,490 B2 | 10/2004 | Cook et al. | | 2002/0198637 A1 | 12/2002 | Shibata |
| 6,804,589 B2 | 10/2004 | Foxford et al. | | 2003/0028297 A1 | 2/2003 | Iihoshi et al. |
| 6,810,323 B1 | 10/2004 | Bullock et al. | | 2003/0050879 A1* | 3/2003 | Rosen et al. ............... 705/35 |
| 6,812,860 B1 | 11/2004 | Schwarzalder, Jr. | | 2003/0051239 A1 | 3/2003 | Hudspeth |
| 6,812,888 B2 | 11/2004 | Drury et al. | | 2003/0063628 A1 | 4/2003 | Marko et al. |
| 6,813,549 B2 | 11/2004 | Good | | 2003/0069683 A1 | 4/2003 | Lapidot |
| 6,816,778 B2 | 11/2004 | Diaz | | 2003/0083813 A1 | 5/2003 | Park |
| 6,819,986 B2 | 11/2004 | Hong et al. | | 2003/0093476 A1 | 5/2003 | Syed |
| 6,823,169 B2 | 11/2004 | Marko et al. | | 2003/0095038 A1 | 5/2003 | Dix |
| 6,823,263 B1 | 11/2004 | Kelly et al. | | 2003/0098782 A1 | 5/2003 | Eastman et al. |
| 6,826,472 B1 | 11/2004 | Kamei et al. | | 2003/0109972 A1 | 6/2003 | Tak |
| 6,836,539 B2 | 12/2004 | Katou et al. | | 2003/0117982 A1 | 6/2003 | Minnick |
| 6,836,667 B1 | 12/2004 | Smith, Jr. | | 2003/0158640 A1 | 8/2003 | Pillar et al. |
| 6,847,871 B2 | 1/2005 | Malik et al. | | 2003/0169182 A1 | 9/2003 | Wilhelm et al. |
| 6,847,872 B2 | 1/2005 | Bodin et al. | | 2003/0191583 A1 | 10/2003 | Uhlmann et al. |
| 6,847,889 B2 | 1/2005 | Park et al. | | 2003/0195695 A1 | 10/2003 | Maruyama et al. |
| 6,850,823 B2 | 2/2005 | Eun et al. | | 2003/0195762 A1* | 10/2003 | Gleason et al. ............... 705/1 |
| 6,859,720 B2 | 2/2005 | Satoh et al. | | 2003/0195814 A1 | 10/2003 | Striemer |
| 6,870,487 B2 | 3/2005 | Nuesser et al. | | 2003/0216859 A1 | 11/2003 | Martell et al. |
| 6,871,067 B2* | 3/2005 | Clark et al. ............... 455/428 | | 2003/0225516 A1 | 12/2003 | DeKock et al. |
| 6,901,374 B1 | 5/2005 | Himes | | 2003/0229441 A1 | 12/2003 | Pechatnikov et al. |
| 6,911,918 B2 | 6/2005 | Chen | | 2003/0236613 A1 | 12/2003 | Satoh et al. |
| 6,920,382 B2 | 7/2005 | Katagishi et al. | | 2004/0012501 A1* | 1/2004 | Mazzara et al. ......... 340/870.11 |
| 6,928,423 B1 | 8/2005 | Yamanaka | | 2004/0024753 A1 | 2/2004 | Chane et al. |
| 6,944,430 B2 | 9/2005 | Bertstis | | 2004/0044605 A1 | 3/2004 | Kress Bodin et al. |
| 6,971,070 B2 | 11/2005 | Obradovich et al. | | 2004/0059781 A1* | 3/2004 | Yoakum et al. ............... 709/204 |
| 6,978,206 B1 | 12/2005 | Pu et al. | | 2004/0068362 A1 | 4/2004 | Maekawa et al. |
| 6,983,200 B2 | 1/2006 | Bodin et al. | | 2004/0068364 A1 | 4/2004 | Zhao et al. |
| 6,987,964 B2 | 1/2006 | Obradovich et al. | | 2004/0073356 A1 | 4/2004 | Craine |
| 6,988,034 B1 | 1/2006 | Marlatt et al. | | 2004/0075774 A1 | 4/2004 | Chang et al. |
| 6,990,407 B1 | 1/2006 | Mbekeani et al. | | 2004/0080430 A1 | 4/2004 | Videtich |
| 6,993,421 B2 | 1/2006 | Pillar et al. | | 2004/0083133 A1* | 4/2004 | Nicholas et al. ............... 705/14 |
| 6,995,686 B2 | 2/2006 | Gosdin et al. | | 2004/0085198 A1 | 5/2004 | Saito et al. |
| 7,010,297 B2 | 3/2006 | Yokota | | 2004/0088478 A1* | 5/2004 | Hall ............... 711/112 |
| 7,043,357 B1 | 5/2006 | Stankoulov et al. | | 2004/0093243 A1 | 5/2004 | Bodin |
| 7,096,115 B1 | 8/2006 | Groth et al. | | 2004/0102898 A1 | 5/2004 | Yokota et al. |
| 7,139,659 B2 | 11/2006 | Mbekeani et al. | | 2004/0104842 A1 | 6/2004 | Drury et al. |
| 7,170,390 B2* | 1/2007 | Quinones et al. ............... 340/5.3 | | 2004/0110515 A1 | 6/2004 | Blumberg et al. |
| 7,174,301 B2 | 2/2007 | Florence et al. | | 2004/0148099 A1 | 7/2004 | Kim |
| 7,184,866 B2 | 2/2007 | Squires et al. | | 2004/0167707 A1 | 8/2004 | Bragansa et al. |
| 7,210,142 B2 | 4/2007 | Hilt et al. | | 2004/0186657 A1* | 9/2004 | Ritter et al. ............... 701/114 |
| 7,216,109 B1 | 5/2007 | Donner | | 2004/0198217 A1 | 10/2004 | Lee et al. |
| 7,292,848 B2 | 11/2007 | Mazzara et al. | | 2004/0203630 A1 | 10/2004 | Wang |
| 7,307,513 B2 | 12/2007 | Shutter et al. | | 2004/0204821 A1 | 10/2004 | Tu |
| 7,383,122 B2 | 6/2008 | Yamada et al. | | 2004/0204842 A1 | 10/2004 | Shinozaki |
| 7,383,123 B2 | 6/2008 | Park | | 2004/0208204 A1 | 10/2004 | Crinon |
| 2001/0001848 A1 | 5/2001 | Oshizawa et al. | | 2004/0213266 A1* | 10/2004 | Willhite et al. ......... 370/395.43 |
| 2002/0002534 A1 | 1/2002 | Davis et al. | | 2004/0233070 A1 | 11/2004 | Finnern |
| 2002/0016655 A1 | 2/2002 | Jao | | 2004/0233101 A1 | 11/2004 | Kim |
| 2002/0029339 A1 | 3/2002 | Rowe | | 2004/0239531 A1 | 12/2004 | Adamczyk |
| 2002/0032507 A1 | 3/2002 | Diaz et al. | | 2004/0242202 A1* | 12/2004 | Torvinen ............... 455/412.1 |
| 2002/0044049 A1 | 4/2002 | Saito et al. | | 2004/0249529 A1 | 12/2004 | Kelly et al. |
| 2002/0049531 A1 | 4/2002 | Tanaka et al. | | 2004/0249530 A1 | 12/2004 | Kelly et al. |
| 2002/0067289 A1 | 6/2002 | Smith | | 2004/0249531 A1 | 12/2004 | Kelly et al. |
| 2002/0072378 A1 | 6/2002 | Gaal | | 2004/0249532 A1 | 12/2004 | Kelly et al. |
| 2002/0073012 A1 | 6/2002 | Lowell et al. | | 2004/0252197 A1* | 12/2004 | Fraley et al. ............... 348/207.1 |
| 2002/0077741 A1* | 6/2002 | Hanebrink ............... 701/117 | | 2004/0260786 A1 | 12/2004 | Barile |
| 2002/0080022 A1 | 6/2002 | Edwards | | 2005/0001743 A1 | 1/2005 | Haemerle |
| 2002/0087237 A1 | 7/2002 | Ol et al. | | 2005/0015186 A1 | 1/2005 | Kelly et al. |
| 2002/0103582 A1 | 8/2002 | Ohmura et al. | | 2005/0015199 A1 | 1/2005 | Lokshin et al. |
| 2002/0103583 A1 | 8/2002 | Ohmura et al. | | 2005/0021197 A1 | 1/2005 | Zimmerman et al. |
| 2002/0103597 A1 | 8/2002 | Takayama et al. | | 2005/0021199 A1 | 1/2005 | Zimmerman et al. |
| 2002/0152021 A1 | 10/2002 | Ota et al. | | 2005/0021594 A1* | 1/2005 | Bernardin et al. ............... 709/200 |
| 2002/0152115 A1 | 10/2002 | Morita et al. | | 2005/0027436 A1 | 2/2005 | Yoshikawa et al. |
| 2002/0156692 A1 | 10/2002 | Squeglia | | 2005/0027449 A1 | 2/2005 | Marsh |
| 2002/0161495 A1 | 10/2002 | Yamaki | | 2005/0033511 A1 | 2/2005 | Pechatnikov et al. |
| 2002/0161841 A1* | 10/2002 | Kinnunen ............... 709/206 | | 2005/0038581 A1 | 2/2005 | Kapolka et al. |
| 2002/0165662 A1 | 11/2002 | Maruyama et al. | | 2005/0038596 A1 | 2/2005 | Yang et al. |
| 2002/0165665 A1 | 11/2002 | Kim | | 2005/0043060 A1 | 2/2005 | Brandenberg et al. |
| 2002/0176494 A1 | 11/2002 | Zhao et al. | | 2005/0043880 A1 | 2/2005 | Yamane et al. |
| 2002/0177926 A1 | 11/2002 | Lockwood et al. | | 2005/0060070 A1 | 3/2005 | Kapolka et al. |

| | | |
|---|---|---|
| 2005/0065678 A1* | 3/2005 | Smith et al. .................... 701/29 |
| 2005/0068174 A1 | 3/2005 | Oesterling et al. |
| 2005/0075095 A1 | 4/2005 | Dillon |
| 2005/0080519 A1 | 4/2005 | Oesterling et al. |
| 2005/0085182 A1 | 4/2005 | Chuberre et al. |
| 2005/0090951 A1 | 4/2005 | Good |
| 2005/0096811 A1 | 5/2005 | Bodin et al. |
| 2005/0125117 A1 | 6/2005 | Breed |
| 2005/0131626 A1 | 6/2005 | Ignatin |
| 2005/0137763 A1 | 6/2005 | Watkins |
| 2005/0137790 A1 | 6/2005 | Yamada et al. |
| 2005/0221876 A1 | 10/2005 | Van Bosch et al. |
| 2005/0222760 A1 | 10/2005 | Cabral et al. |
| 2005/0273218 A1* | 12/2005 | Breed et al. .................... 701/2 |
| 2005/0288856 A1 | 12/2005 | Uyeki et al. |
| 2006/0055565 A1 | 3/2006 | Kawamata et al. |
| 2006/0116800 A1 | 6/2006 | Obradovich et al. |
| 2008/0088480 A1 | 4/2008 | Rozum et al. |
| 2008/0106436 A1* | 5/2008 | Breed ........................ 340/905 |

FOREIGN PATENT DOCUMENTS

| | | |
|---|---|---|
| EP | 1137210 | 9/2001 |
| JP | 6276056 | 9/1994 |
| JP | 8149029 | 6/1996 |
| JP | 10-150477 | 6/1998 |
| JP | 2000112978 | 4/2000 |
| JP | 2000201104 | 7/2000 |
| JP | 2000293788 | 10/2000 |
| JP | 2001168743 | 6/2001 |
| JP | 2001-216555 | 8/2001 |
| JP | 2001343979 | 12/2001 |
| JP | 2002-032276 | 1/2002 |
| JP | 2002-077295 | 3/2002 |
| JP | 2002-084298 | 3/2002 |
| JP | 2002-318844 | 10/2002 |
| JP | 2003122785 | 4/2003 |

OTHER PUBLICATIONS

"The Flawed Future of Radio", Acidus' Article Published in 2600 Magazine; Release date Jan. 15, 2003; 5 pages.

"Sirius Satellite Radio—Help", Help, dated Oct. 6, 2002 by archive.org; 8 pages.

Japanese Decision of Rejection mailed Oct. 27, 2009 from Japanese Application No. 2007-507441.

Japanese Office Action dated Nov. 4, 2009, from Japanese Patent Application No. 2006-545357 and English translation.

U.S. Office Action mailed Oct. 14, 2009 from U.S. Appl. No. 10/737,221.

* cited by examiner

METHOD AND SYSTEM FOR CONTROLLING THE EXCHANGE OF VEHICLE RELATED MESSAGES

RELATED APPLICATION INFORMATION

This patent application claims priority pursuant to 35 U.S.C. §119(c) to U.S. Provisional Patent Application Ser. No. 60/560,088, entitled "METHOD AND SYSTEM FOR ADMINISTRATING AND CONTROLLING THE EXCHANGE OF SERVICES AND INFORMATION BETWEEN A VEHICLE AND A REMOTE LOCATION," which was filed with the U.S. Patent and Trademark Office on Apr. 6, 2004.

BACKGROUND OF THE INVENTION

1. Field of the Invention

The present invention relates to a method and system for administering and controlling information provisioned to vehicles from a remote location. More specifically, the present invention relates to administering and controlling vehicle-related information provisioned between a vehicle and the remote location.

2. Description of Related Art

The upkeep and maintenance of vehicles is essential to maintain a vehicle in good running condition and to maintain the overall reputation of a vehicle manufacturer. For example, even if a vehicle malfunctions or breaks down because of user neglect, as opposed to a vehicle defect, the reputation of the vehicle manufacturer will still be injured, especially if several vehicles malfunction because of user neglect. Thus, as users often neglect to regularly service their vehicles, upgrade their vehicles with improved replacement parts, and, in some cases, even forget to replace recalled vehicle parts, it is important to remind users to service their vehicles.

Known methods to remind users are very inflexible, cumbersome and inefficient. In previous methods, vehicles were manufactured with warning lights that are activated when an event occurs. For example, maintenance reminder lights and low oil level lights are activated to remind users to bring their car to a service provider. The lights are activated only according to the time intervals and levels that were originally preprogrammed into the memory of a vehicle. Thus, if a service provider that a user used to service his vehicle determined that a new service schedule should be applied that differed from the original preprogrammed schedule, the service provider could not update the memory to incorporate the new schedule, or it would be very difficult to do so. Likewise, if a user wanted to deactivate such reminders, the user could not do so without following an intricate set of steps that usually required the assistance of a professional service provider to carry out.

Moreover, subsequent developments, such as car part recall notices or the development of an improved part to be used in the vehicle, could not be sent to the vehicle by using such previous methods. To inform users of such developments, vehicle manufacturers and other service providers were forced to resort to mailing product brochures and the like to users. The process of mailing brochures is not only expensive but timely, cumbersome, and inefficient.

Even if a user wished to bring in his car for service in response to a warning light or receipt of an updated brochure, the user would be required to locate the phone number of the service provider, contact the service provider, and schedule an appointment. Because much of the information a user would need to make the appointment is typically not carried with the user, the user would be forced to schedule the appointment after he exited the vehicle. After exiting the vehicle the user may forget to schedule the appointment despite maintenance notification lights or a brochure. So, despite maintenance notification lights or a brochure, after exiting the vehicle, the user may forget to schedule the appointment.

Other known methods provide retail and sales information to a vehicle based on a profile of the user, but such methods do not provide vehicle-related information to a user. As a result, the other methods do not address the need to provide a convenient and flexible way to inform the user of service schedules, product recalls, and other notices pertinent to the vehicle.

In addition, in known methods, users often observe the preprogrammed notices but do not comprehend the significance of the notices. In other words, users often do not understand whether or when they should bring in the vehicle for service in response to the notice. Previous methods provided a two-way calling mechanism for the user to place a call to a live operator when the notice appeared. The live operator could then explain the significance of the notice to the user. Other methods automatically send a message to the live operator when one of the vehicle's air bags deploys.

Such known methods, however, are very limited and inflexible. For example, users do not have the option to determine whether information regarding the occurrence of an event should be transmitted automatically, not transmitted, or transmitted on a case-by-case basis to a remote location. In the prior art methods, users do not have the option to automatically send information about the occurrence of most events to the remote location. Rather, the users must manually use the two-way calling mechanism to inform an operator that a notification light has been activated. As a result, the previous methods leave the user with limited and inflexible ways to transmit to a remote location information pertaining to vehicle problems.

Other known methods have attempted to send general information to particular vehicles, but have used very inefficient and inflexible ways to do so. For example, the known methods use one-to-one communication systems to individually send data streams to particular vehicles in an attempt to send vehicle-specific data to a particular vehicle. The problem with these methods, however, is that many vehicles may require the same information. For example, several vehicles might require information that affects users throughout a geographic region. The previous methods, therefore, require the transmittal of the same information several times to a plurality of vehicles, resulting in a waste of precious bandwidth.

Other methods involve the transmittal of the same information to all vehicles. The problem with these methods is that many vehicles are already inundated with a large amount of unwanted information, and the users are required to sift through the unwanted information.

As a result, systems and methods have been developed for the transmittal of vehicle-related information from a remote location to a vehicle that allow for the selective transmittal of vehicle-related information from the vehicle to a remote location. In addition, systems and methods have been developed to efficiently send vehicle-specific information to vehicles. However, there remains a need for systems and methods to administer and control the transmittal of vehicle-related information from a remote location to a vehicle and/or from the vehicle to the remote location.

SUMMARY OF THE INVENTION

The present invention addresses the shortcomings of the prior art systems and methods. In particular, the present invention is directed to a system and method for administering and controlling the transmittal of vehicle-related information from a remote location to a vehicle and/or from the vehicle to the remote location.

Pursuant to a first aspect of the invention, a message portal administers and controls the exchange of information from a remote location to vehicles. The message portal operates between a remote location and vehicles having vehicle information devices (VIDs). The message portal receives information (e.g., vehicle-related information or messages) from the remote location and broadcasts the information to the vehicles via a one-to-many communication network. In one embodiment, the one-to-many communication network is a broadcast network or a XM Radio satellite network.

Pursuant to a second aspect of the invention, the message portal administers and controls the exchange of information between a vehicle and a remote location. This aspect of the invention includes a VID and a mobile unit or a hands-free device. The VID is located on a vehicle and uses a back channel communication network (e.g., the wireless communication network) to communicate with a remote location or business components. The message portal (or a web server) operates between the vehicle and the remote location to administer and control the exchange of information (e.g., vehicle-related information or messages) between the vehicle and the remote location. For example, the message portal may receive a fault message from a vehicle. This fault message is then forwarded to a publish/subscribe service that publishes the fault message. By publishing this fault message, the remote location can analyze the fault message and generate a response message, which is broadcast to the vehicle that generated the fault message.

Pursuant to a third aspect of the invention, a backchannel message portal and a broadcast message portal are interconnected as a single message portal. This single interconnected message portal then administers and controls broadcast messages from a remote location to vehicles via a one-to-many communication network and administers and controls two-way communication messages between a remote location and a vehicle via a backchannel communication network (e.g., a wireless communication network).

Pursuant to a fourth aspect of the invention, an administrative worksheet allows a user to customize weighting algorithms which compare messages and select the next message to send to a vehicle. The administrative worksheet allows a user to customize the weight given to a specific variable (e.g., category, saturation level, activation date, etc.).

Pursuant to a fifth aspect of the invention, a user interface provides the ability to list multiple messages related to a specific vehicle (e.g., function as a search engine), view a specific message, view the content of a specific message and delete messages. The user interface also provides tools to update the parameters of the scheduler.

A more complete understanding of the system and method for facilitating the exchange of information between a remote location and a vehicle will be afforded to those skilled in the art, as well as a realization of additional advantages and objects thereof, by a consideration of the following detailed description of the preferred embodiment. Reference will be made to the appended sheets of drawings which will first be briefly described.

DETAILED DESCRIPTION OF THE PREFERRED EMBODIMENT

The present invention is directed to a system and method for administering and controlling the transmittal of vehicle-related information from a remote location to a vehicle and/or from the vehicle to the remote location.

Figure 1:
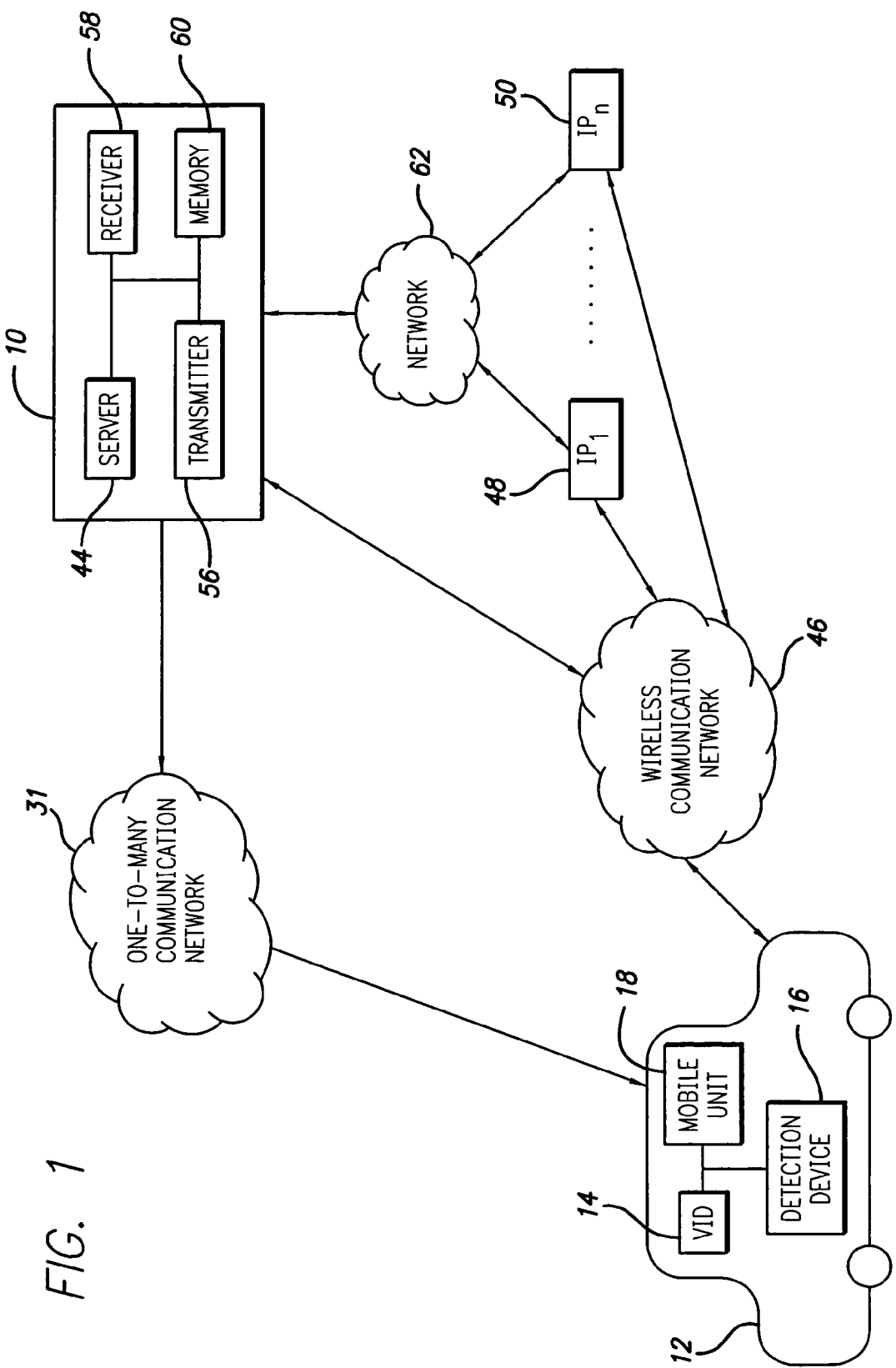
FIG. 1 is a schematic diagram of a first embodiment of a system pursuant to aspects of the invention.

FIG. 1 shows a first embodiment of a system for facilitating the exchange of information between a remote location 10 and a vehicle 12 pursuant to aspects of the invention. The vehicle 12 includes a vehicle information device (VID) 14, vehicle detection devices 16, and a mobile unit 18.

Figure 1A:
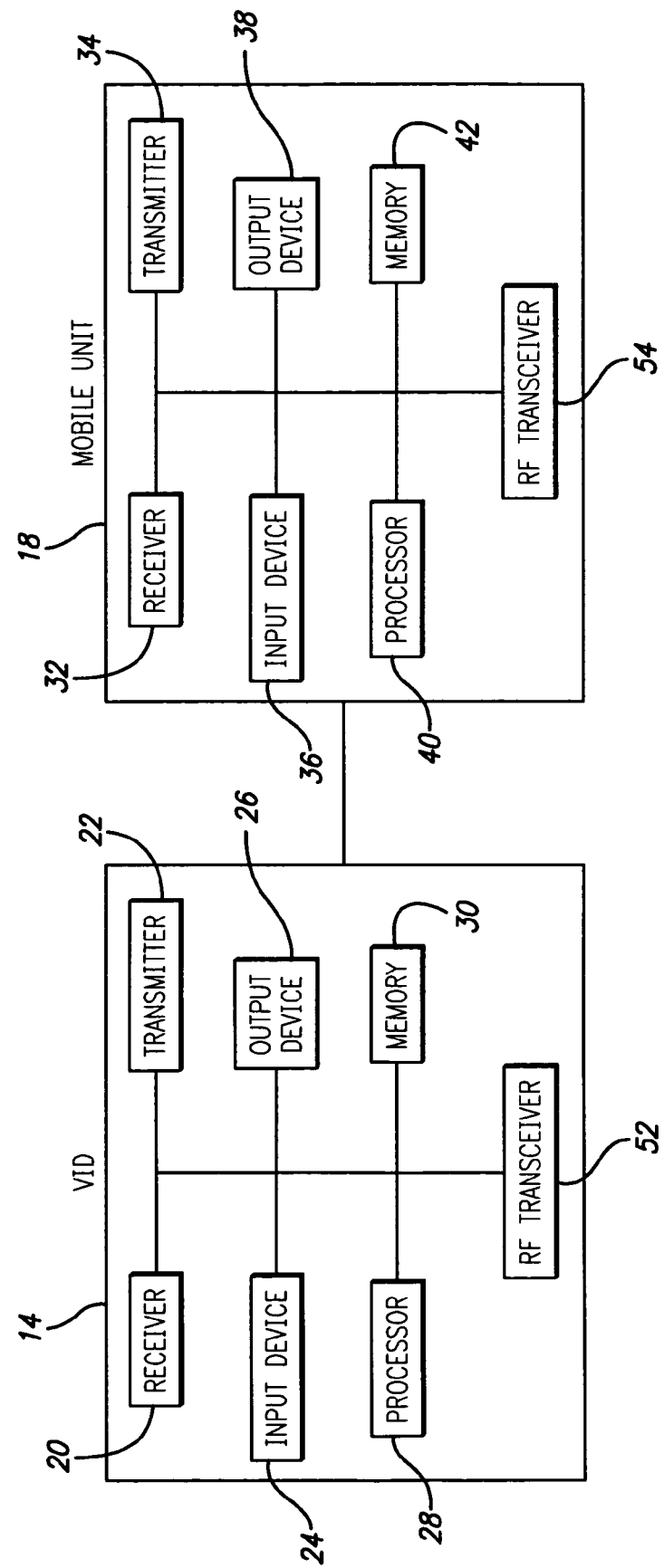
FIG. 1a is a schematic diagram of a vehicle information device (VID) in communication with a mobile unit pursuant to aspects of the invention.

As shown in FIG. 1a, the vehicle information device (VID) 14 includes a VID receiver 20, a VID transmitter 22, VID input 24 and output 26 devices, a VID processor 28, and a VID memory 30 that are all in electrical communication with one another. The VID memory 30 includes at least a portion of the user profile and, in some embodiments, includes the entire user profile. As is provided in greater detail below, the user profile stored in the VID memory 30 may be updated in the vehicle by way of the VID input device 24, which includes at least a keyboard, a touch sensitive display and/or a microphone. The user profile may also be updated by way of information received through the VID receiver 20.

The VID receiver 20 receives information from the remote location 10 and, in one embodiment, is in communication with the remote location by way of a one-to-many communication system. One-to-many communication systems include systems that can send information from one source to a plurality of receivers, such as a broadcast network 31. Broadcast networks include television, radio and satellite networks. In one embodiment, the broadcast network 31 is the XM Radio satellite network, which comprises broadcast towers, satellite servers and satellites. The information received by the VID receiver 20 may be accessed by way of the VID output device 26, which includes at least one of a VID display and a VID speaker. The VID receiver 20 and output device 26 provide access to only a subset of the received broadcasted information to the user based on user preferences. The user preferences, as well as user identity information and vehicle identity information, are part of the user profile.

The vehicle also includes vehicle detection devices 16 that are in communication with the VID 14. The vehicle detection devices 16 detect and monitor the levels and conditions of several vehicle parts. For example, one vehicle detection device 16 monitors the engine temperature and another monitors the oil level. The vehicle detection devices 16 send the monitored levels and conditions to the VID 14, which processes the information by, for example, comparing the monitored levels against threshold levels stored in the VID memory 30.

Figure 2:
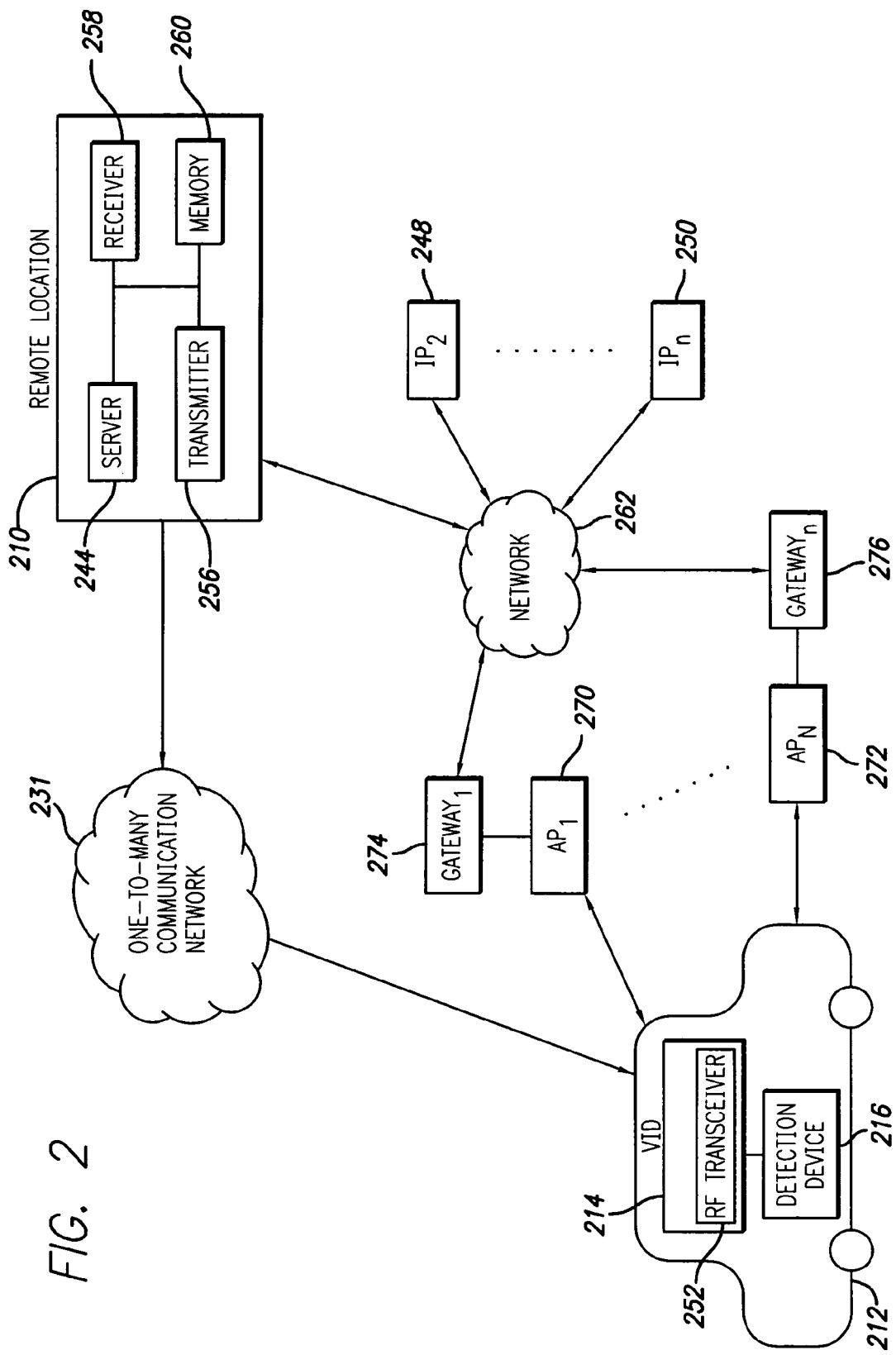
FIG. 2 a schematic diagram of an alternate embodiment of a system pursuant to aspects of the invention.

In the first embodiment, the mobile unit 18 is used to receive and transmit information from and to the remote location 10; and, in an alternate embodiment shown in FIG. 2, an RF transceiver 252 is used to receive and transmit information from and to the remote location 210. The mobile unit 18 may be a wireless phone or any other device that communicates with other devices by way of the wireless communication network 46. As shown in FIG. 1*a*, the mobile unit 18 includes a mobile unit receiver 32, a mobile unit transmitter 34, mobile unit input 36 and output 38 devices, a mobile unit processor 40, and a mobile unit memory 42 that are in communication with one another. The mobile unit 18 is in communication with the remote location 10 by way of the mobile unit receiver 32, the mobile unit transmitter 34, and a wireless communication network 46, which comprises numerous base stations. In one embodiment, information is transmitted from or to the vehicle or remote location over a high bandwidth GPRS/1XRTT channel of the wireless communication network 46. If the high bandwidth channel is unavailable, a low bandwidth DTMF channel is used. The mobile unit receiver 32 receives information from the remote location 10, and the mobile unit transmitter 34 transmits information to the remote location 10. In other embodiments described below in greater detail, the mobile unit transmitter 34 also transmits information to information providers 48, 50.

In one embodiment, the information received from and transmitted to the remote location 10 by way of the mobile unit 18 is accessed by the user through the VID 14, which is in communication with the mobile unit. The mobile unit 18 may be embedded in the vehicle 12 and be in communication with the VID 14 by, for example, a cable.

In another embodiment, the VID 14 and mobile unit 18 are in communication with one another by way of RF transceivers 52, 54. Both the VID 14 and the mobile unit 18 include RF transceivers 52, 54, which, in one embodiment, comply with the Bluetooth® wireless data communication format. The RF transceivers 52, 54 allow the VID 14 and mobile unit 18 to communicate with one another. In other embodiments not shown, the VID and mobile unit receivers 20, 32 and transmitters 22, 34 allow the VID and mobile unit to communicate with one another. In yet other embodiments, there may be an RF transceiver that is separate from the VID 14 and mobile unit 18 and that allows the VID and mobile unit to communicate with one another.

In the alternate embodiment shown in FIG. 2, the VID 214 transmits and receives information to and from the remote location 210 by way of the RF transceiver 252, access points 270, 272 and gateways 274, 276 that are in communication with the network 262. In one embodiment, the RF transceiver 252 and access points 270, 272 are compliant with the IEEE 802.11 specification, and such transceivers and access points include Wi-Fi® certified equipment. The access points 270, 272 are typically in communication with the gateways 274, 276 by way of a cable, and the gateways are in communication with the remote location 210 by way of the network 262. The access points 270, 272 are in communication with the RF transceiver 252 and have a limited range over which they can communicate with the RF transceiver 252. Thus, it is preferable that there be numerous access points 270, 272 positioned so that the distance between the access points and the areas through which a vehicle 12 might pass is less than or equal to the limited range of the access points. When the access points 270, 272 are so positioned, the RF transceiver 252 effectively exchanges information with the access points 270, 272 and, thus, the remote location 210.

Note that in the alternate embodiment of FIG. 2, the VID 214 also includes VID input and output devices, a VID receiver, a VID memory and a VID processor, none of which are shown. The VID components of the alternate VID embodiment 214 have the same functionality as do the VID components of the first embodiment 14.

The remote location 10, 210 includes a remote server 44, 244 a remote transmitter 56, 256 and receiver 58, 258, and a remote memory 60, 260 that are in communication with one another. As provided above in the first embodiment, the remote transmitter and receiver 56, 58 communicate with the VID 14 and mobile unit 18 by way of the broadcast 31 and wireless 46 communication networks, respectively; and, in the alternate embodiment, the remote transmitter and receiver 256, 258 communicate with the VID 214, including the RF transceiver 252, by way of the broadcast communication network 231 and a network 262. The remote location 10, 210 is also in communication with information providers 48, 50, 248, 250 such as vehicle dealers, vehicle service providers and users of the vehicles, by way of the network 62, 262.

In both the first and alternate embodiments shown in FIGS. 1 and 2, the network 62, 262 is typically a wide area network (WAN) such as the Internet. In other embodiments, some of the information providers 48, 50, 248, 250, such as the vehicle dealers and vehicle service providers, may be in communication with the remote location 10, 210 by way of a local area network (LAN), while other information providers 48, 50, 248, 250 such as the vehicle users, are in communication with the remote location by way of the Internet. In yet other embodiments, the RF transceiver 252 is in communication with the remote location 210 and/or the information providers 248, 250 by way of a network 262 that is a LAN. In these other embodiments, the LAN 262 is compliant with the IEEE 802.3 specification or is an Ethernet network.

The information providers 48, 50, 248, 250 may transmit updated user profiles and new vehicle-related information to the remote location 10, 210. A plurality of user profiles are in a user profile database, which, along with other vehicle-related information, is stored in the remote memory 60, 260. The updated user profiles and new vehicle-related information are transmitted from the remote location 10, 210 to the VID 14, 214 by way of the broadcast network 31, 231. In other embodiments, the new vehicle-related information and updated user profiles may be transmitted to the vehicles 12, 212 by way of the wireless network 46 or the network 262. At the vehicle, the user profile stored in the VID memory 30 is updated, and the vehicle-related information is made accessible to the user by way of the VID output device 26. In other embodiments, the information providers may communicate directly with the mobile unit 18 or RF transceiver 252 by way of the wireless communication network 46 or the network 262.

Figure 3:
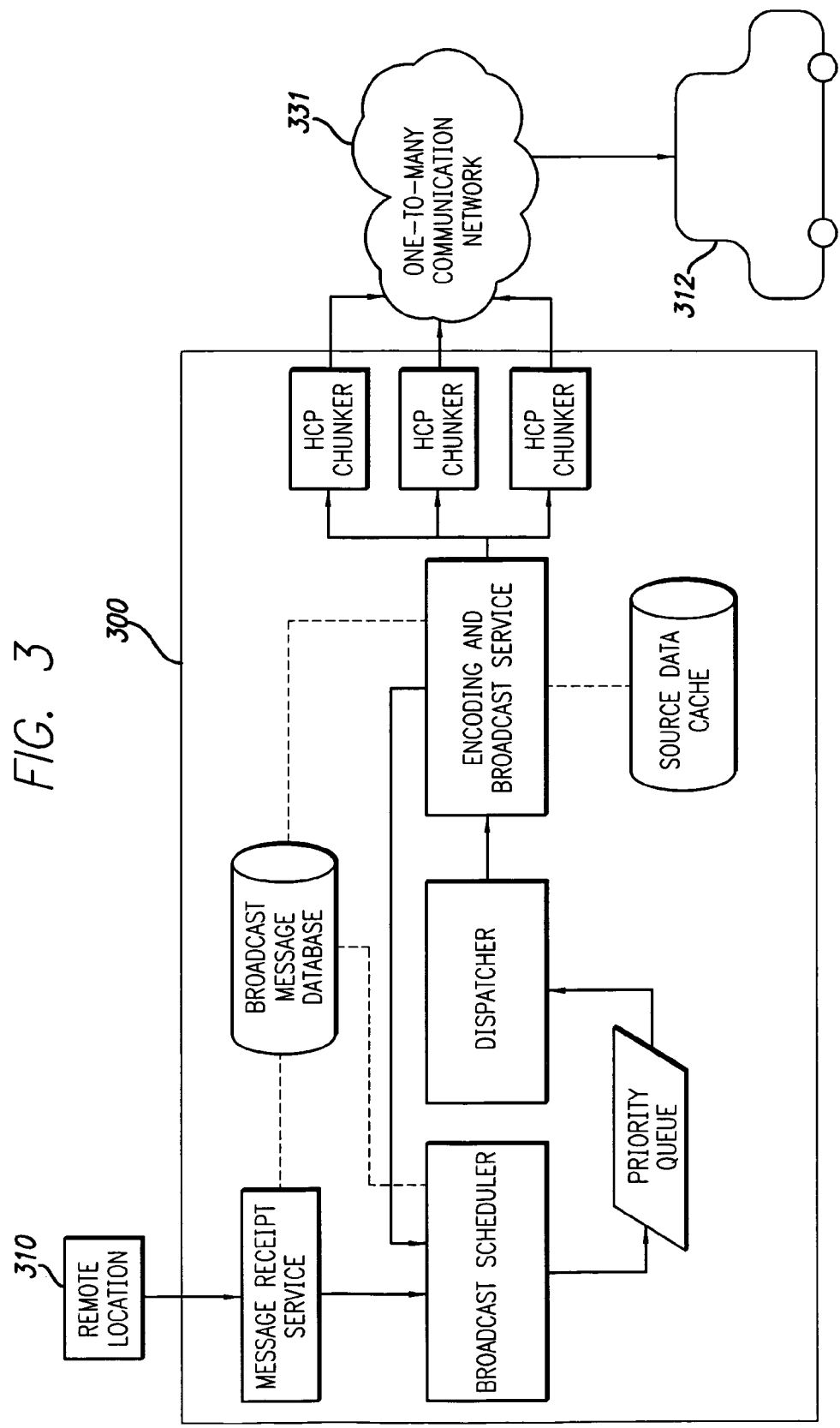
FIG. 3 is a schematic diagram of an embodiment of a message portal pursuant to aspects of the invention.

FIG. 3 shows an embodiment of a method and system for administering and controlling the exchange of information from a remote location to vehicles pursuant to aspects of the invention. The embodiment includes a message portal 300 that operates between a remote location 310 and vehicles 312 having VIDs (e.g., 14 and 214 shown in FIGS. 1 and 2). The message portal 300 receives information (e.g., vehicle-related information or messages) from the remote location and broadcast the information to the vehicles 312 via a one-to-many communication network 331. In one embodiment, the one-to-many communication network 331 is a broadcast network or a XM Radio satellite network.

Figure 3A:
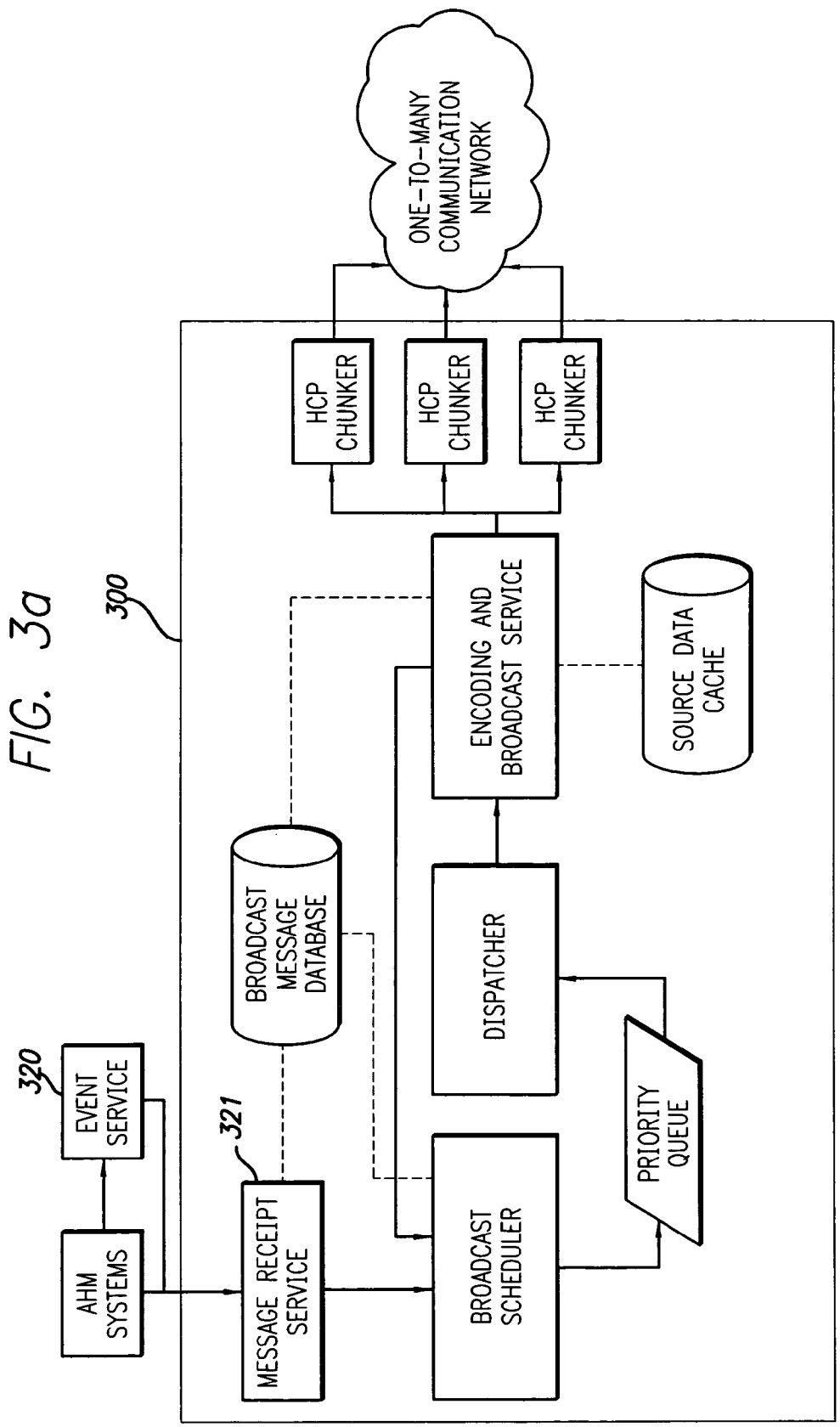
FIGS. 3a-3g are schematic diagrams illustrating various operational details of the embodiments of FIG. 3.
Figure 3B:
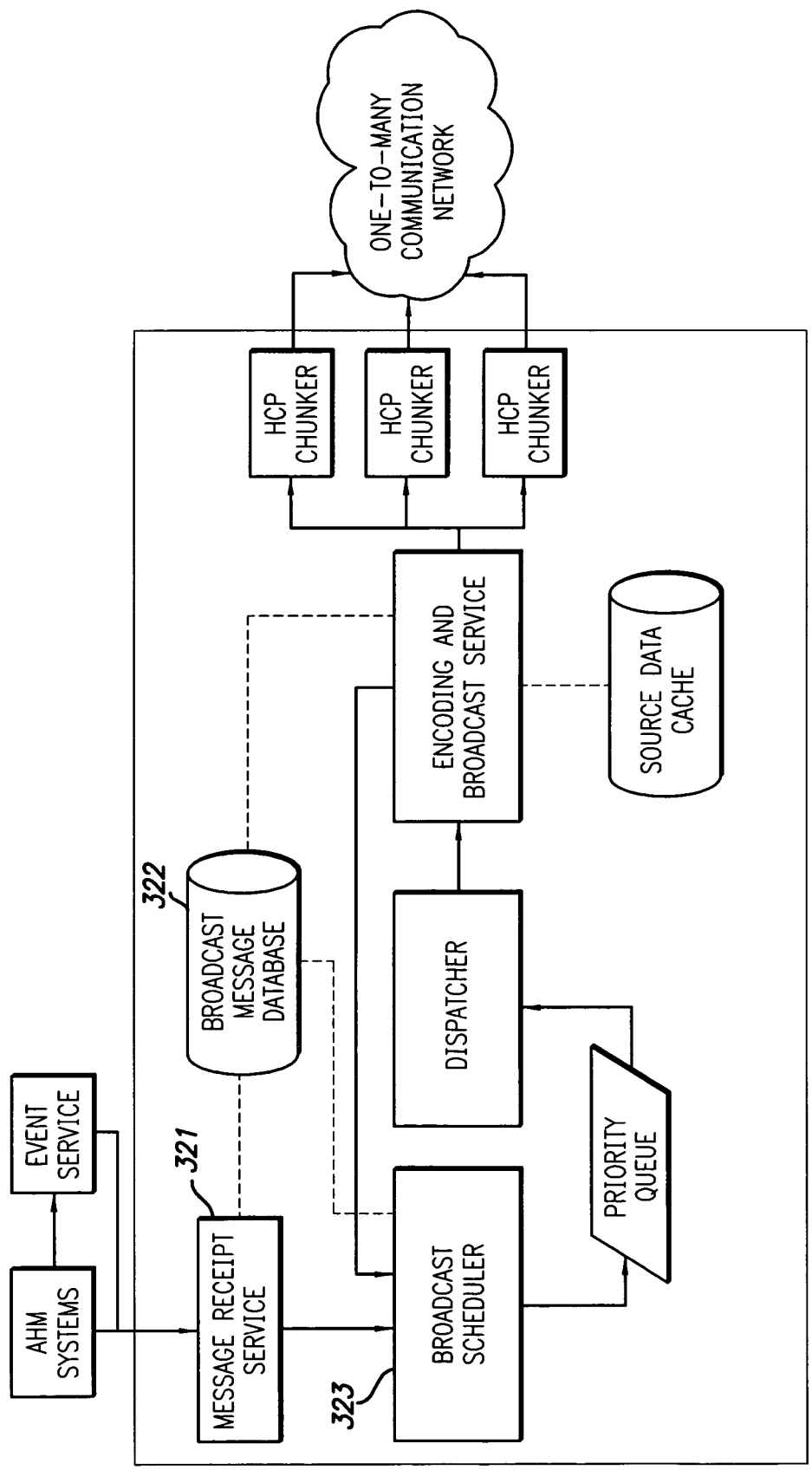

In operation, as shown in FIG. 3a, the remote location 310 submits an information or a message to be broadcasted to a message service 321 of the message portal 300 either directly or via an event service 320. The message receipt service 321 then verifies the message (e.g., verifies that the message is from the remote location 310 and/or that it has received the message). Referring now to FIG. 3b, the message receipt service 321 then saves the message in a database or a broadcast message database 322. The broadcast message database 322 may be a structured query language (SQL) server database for storing message data. In addition, the message receipt service 321 submits the message to a broadcast scheduler 323.

Figure 3C:
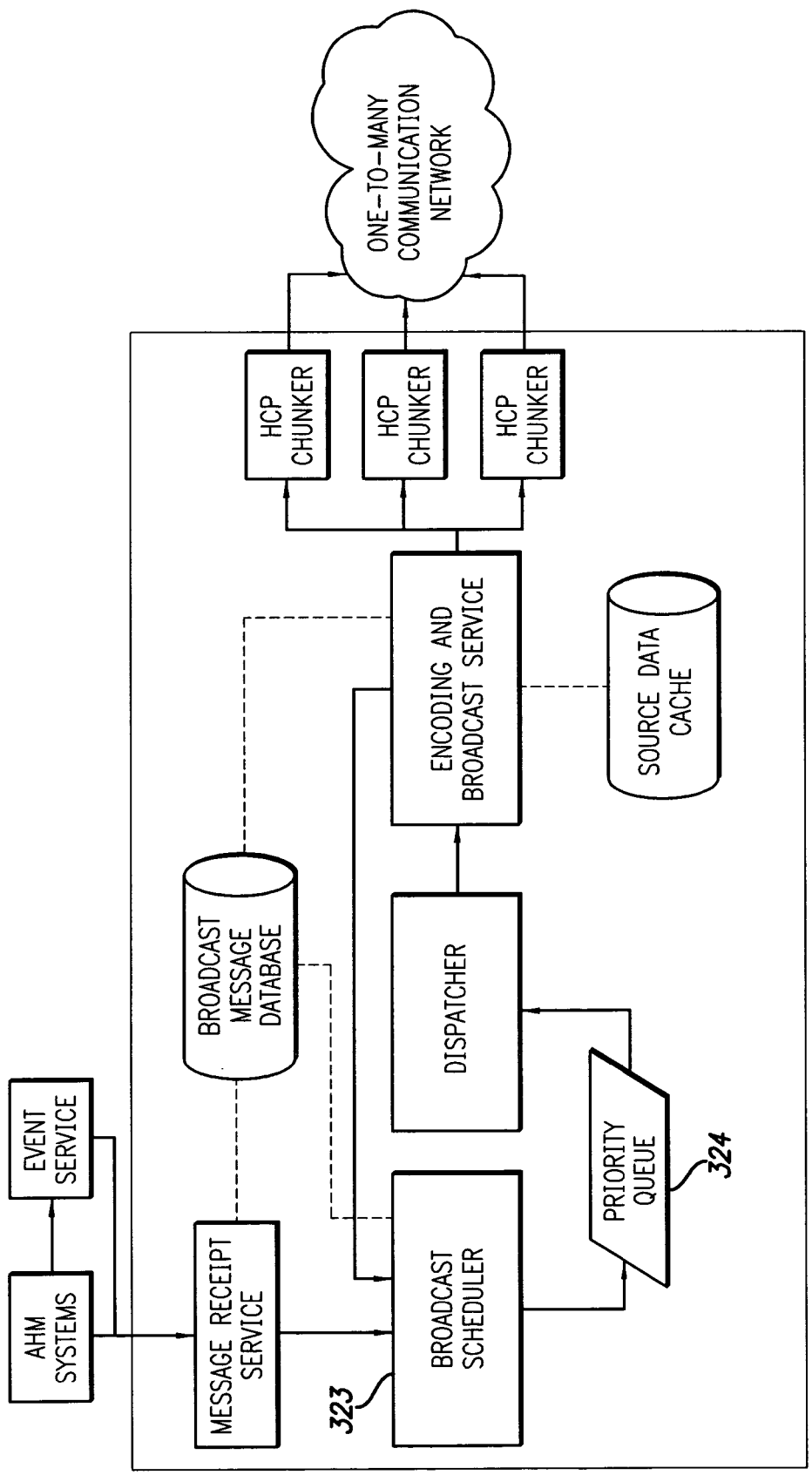
Figure 3D:
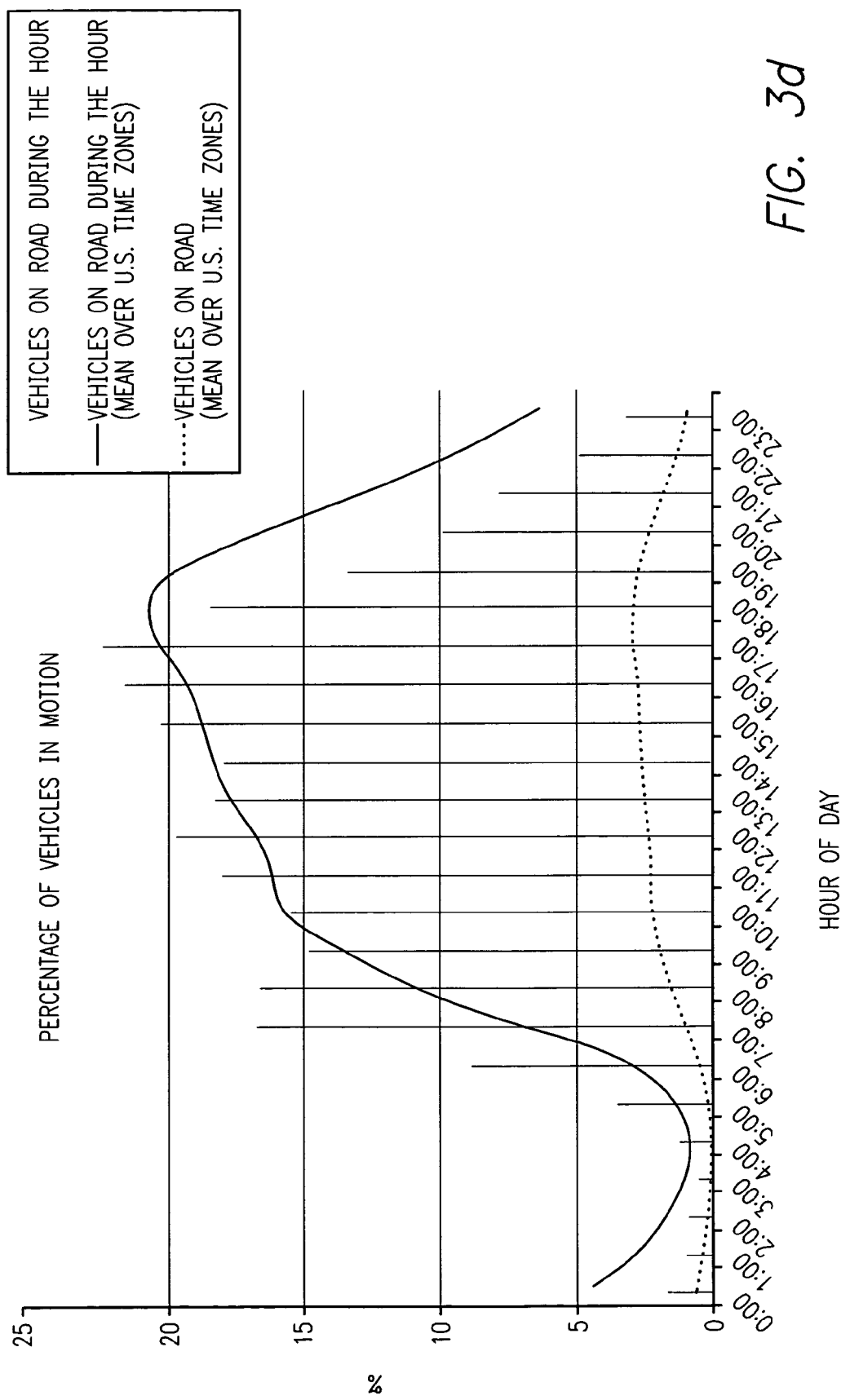

Referring now to FIG. 3c, the broadcast scheduler 323 then determines when the message should be broadcast and then sends the message to a priority queue 324. In one embodiment, the priority queue 324 sorts messages that it receives according to: (1) category of the message; (2) service level of the message; (3) current saturation of vehicles in motion as shown in FIG. 3d; (4) proximity to activation data; and/or (5) if the message is overdue. The broadcast scheduler 323 and the priority queue 324 may determine the order in which messages should be broadcast though a series of weighting algorithms that compare messages and deterministically select the "next" message to be broadcast. These weighting algorithms rely on weighting factors. The value for these factors can be set by an administrator of the message portal 300. For example, the administrator may use an administration worksheet to show the effect of changing each variable in the scheduler. The administration work sheet can be any work sheet known to those skilled in that art that can assist the administrator to determine what values are required and then enter these values into the message portal 300.

Figure 3E:
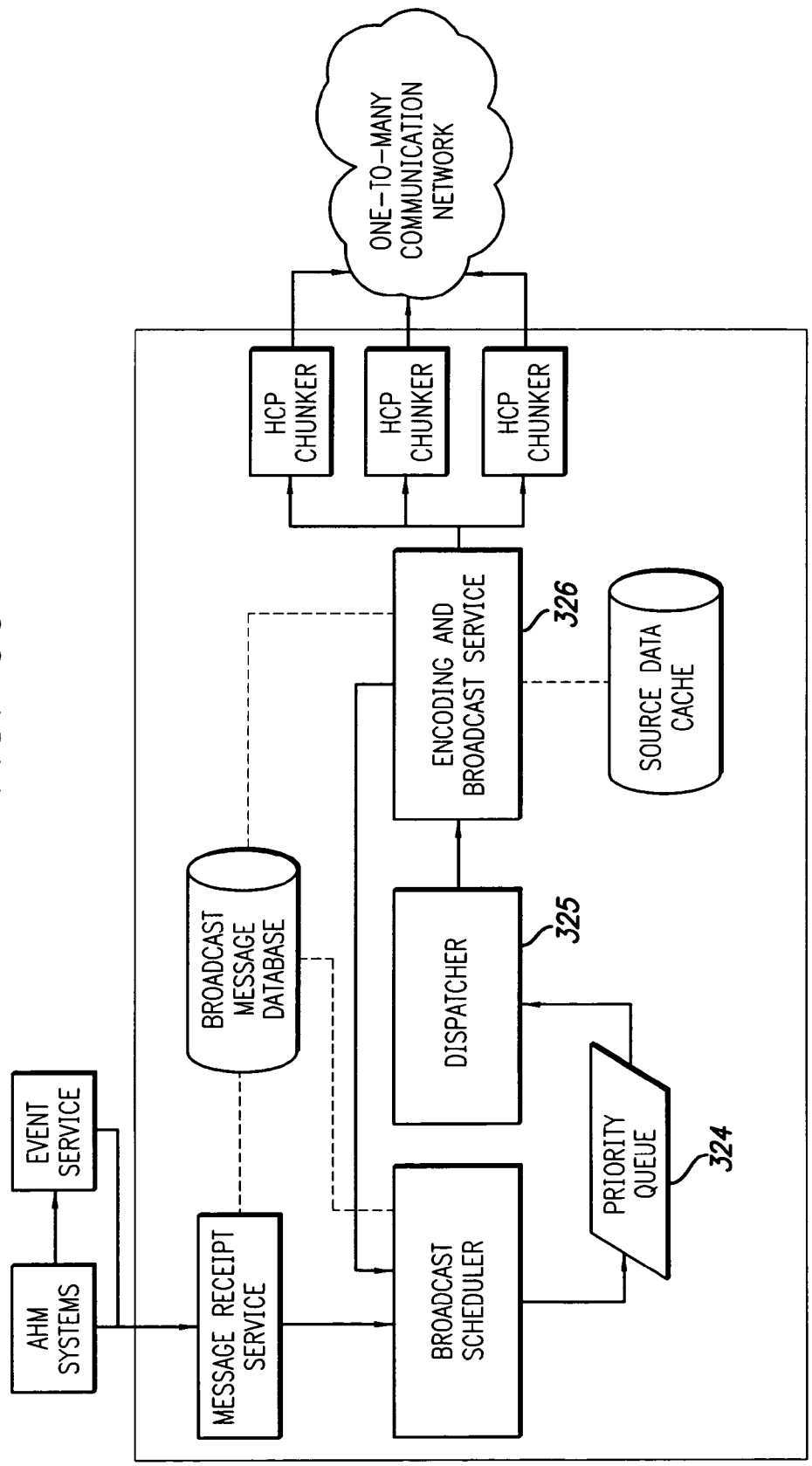
Figure 3F:
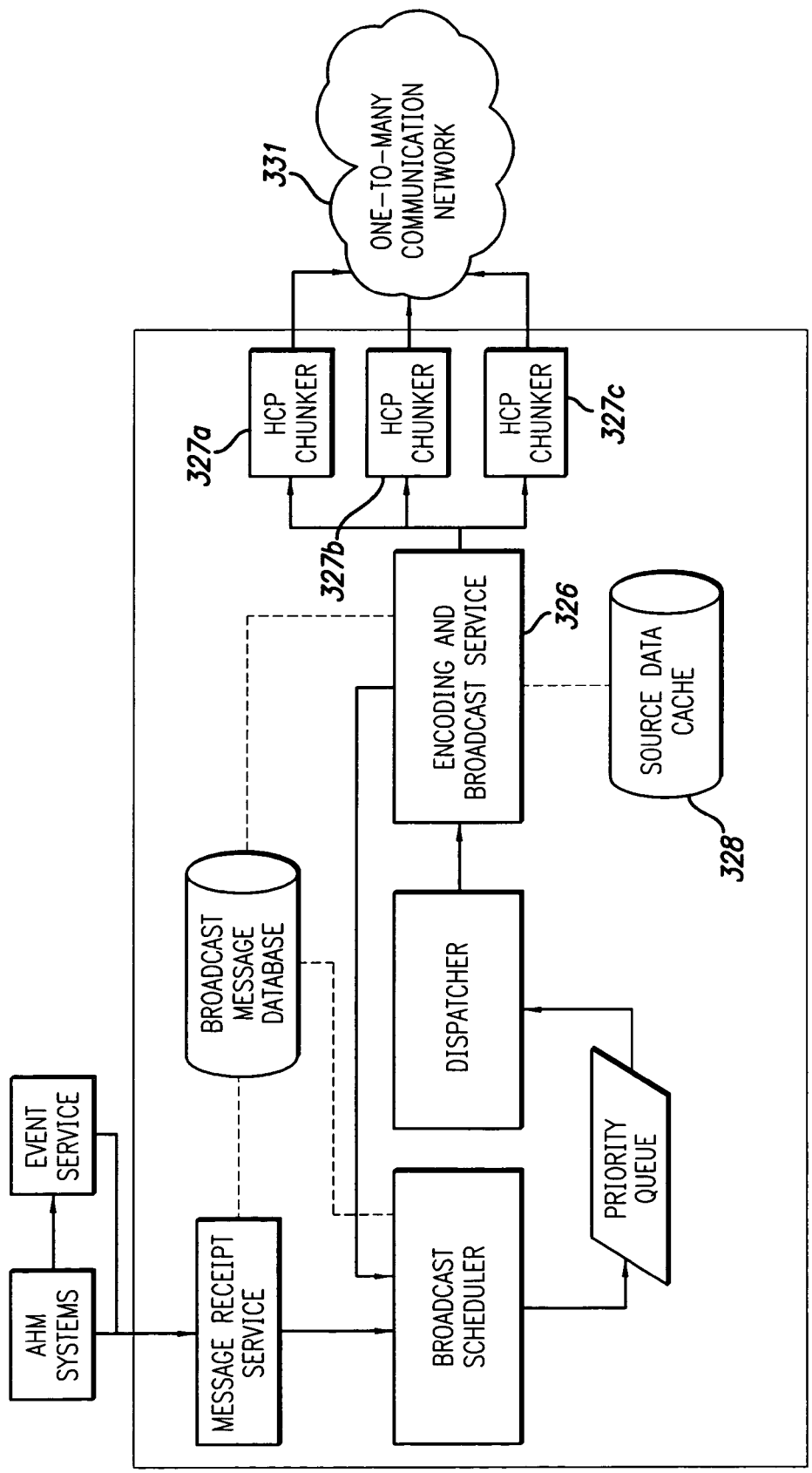

Referring now to FIG. 3e, a dispatcher 325 then retrieves the message (or the next message) from the priority queue 324. The message is then forwarded to an encoding and broadcast service 326 for encoding and broadcasting the message to the vehicles 312. In one embodiment and referring now to FIG. 3f, the encoding and broadcast service 326 converts the message into a format expected by the vehicles 312. The encoded message is then conveyed to one or more chunkers 327a, 327b, 327c that divide the messages into a plurality of packets. In one embodiment, the chunkers 327a, 327b, 327c are host configuration protocol (HCP) chunkers that divide the message into a plurality of packets and/or assign the packets to an assigned address (e.g., the assigned address of a receiver on one of the vehicles 312). The packets are then sent to the vehicles 312 via the one-to-many communication network 331 (e.g., the XM network). In addition, part of or the entire message may also be stored or cached in a source data cache 328 for further broadcasting to save on network download latency.

Figure 3G:
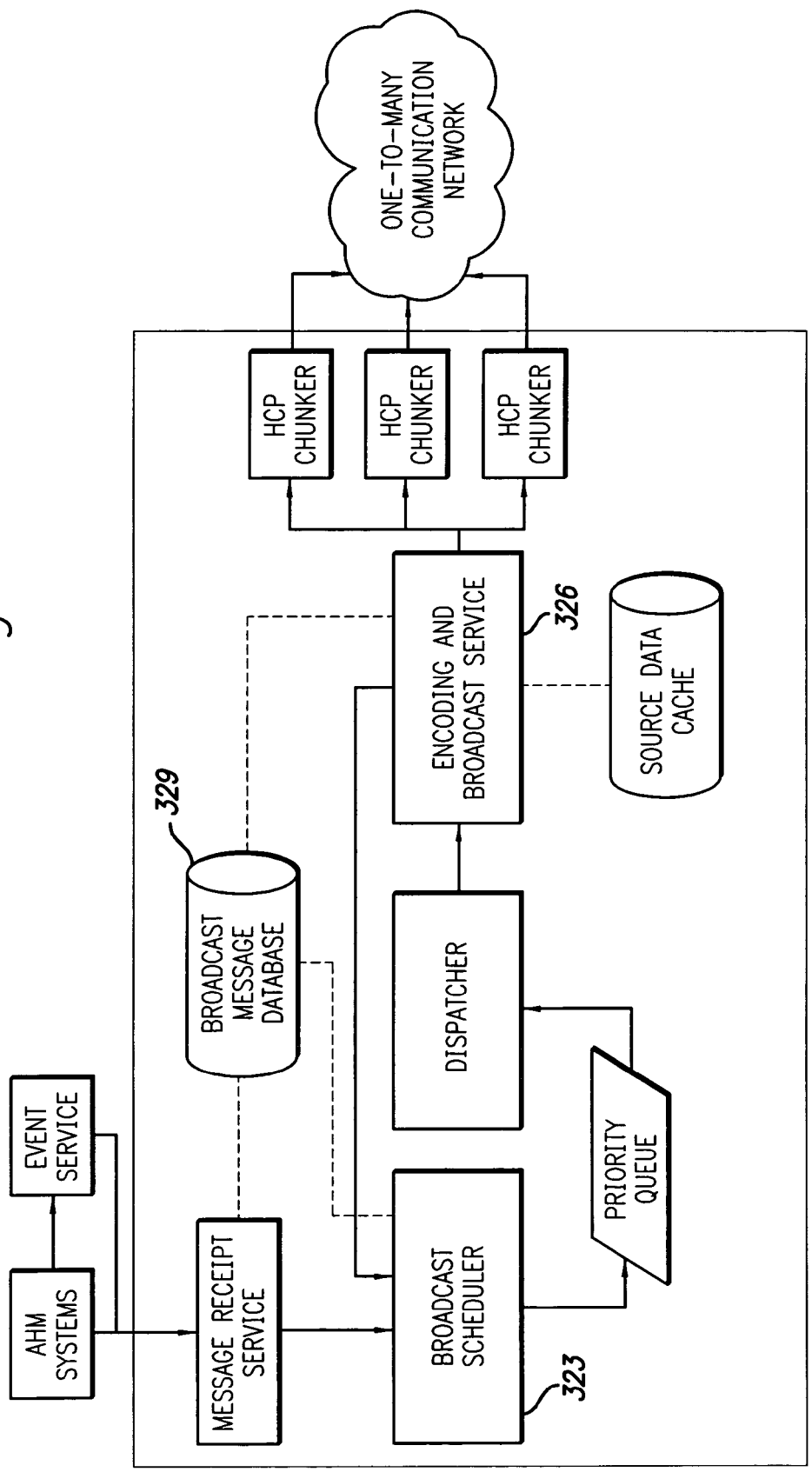

Referring now to FIG. 3g, a broadcast service 329 then logs the time the massage was broadcasted by the encoding and broadcast service 326. This logged information is then conveyed to the broadcast scheduler 323 to schedule the next transmission (or a next message for broadcasting).

Those skilled in the art will appreciate that the above embodiment for administering and controlling the exchange of information from a remote location to vehicles is intended to be flexible, so that additional features may be added or modified. In should be also appreciated that the above described mechanisms and process for administering and controlling the exchange of information are for purposes of example only and the invention is not limited thereby.

Figure 4:
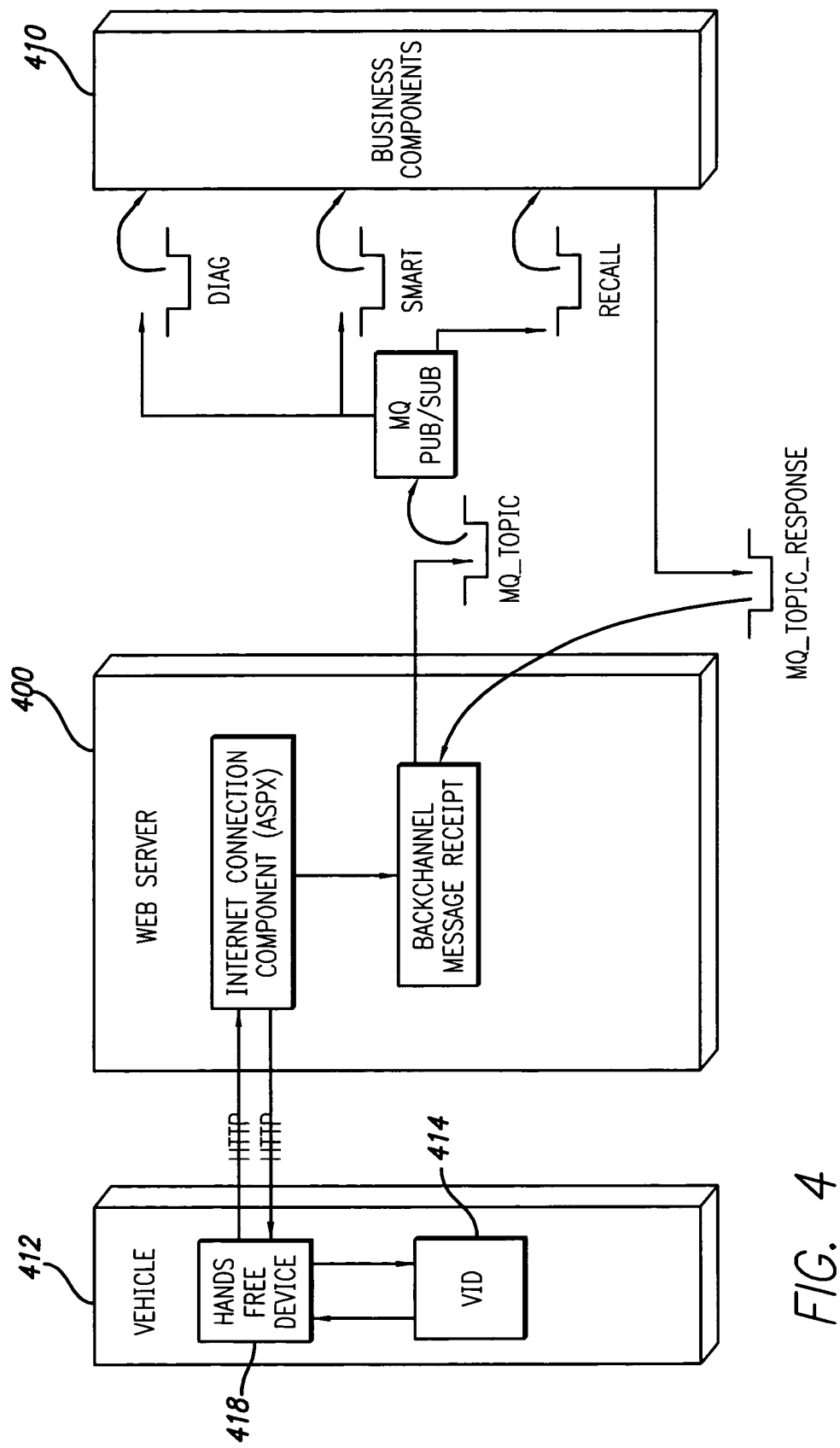
FIG. 4 is a schematic diagram of an alternate embodiment of a message portal pursuant to aspects of the invention.

FIG. 4 shows an embodiment of a method and system for administering and controlling the exchange of information between a vehicle and a remote location pursuant to aspects of the invention. The embodiment includes a VID 414 (e.g., 14, 214 shown in FIGS. 1, 2) and a mobile unit or a hands-free device 418. The VID 414 is located on a vehicle 412 and uses a backchannel communication network (e.g., the wireless communication network 46 shown in FIG. 1 or the network 262 shown in FIG. 2) to communicate with a remote location or business components 410. In addition, the embodiment includes a message portal or a web server 400 that operates between the vehicle 412 and the remote location 410. The message portal 400 administers and controls the exchange of information (e.g., vehicle-related information or messages) between the vehicle 412 and the remote location.

Figure 4A:
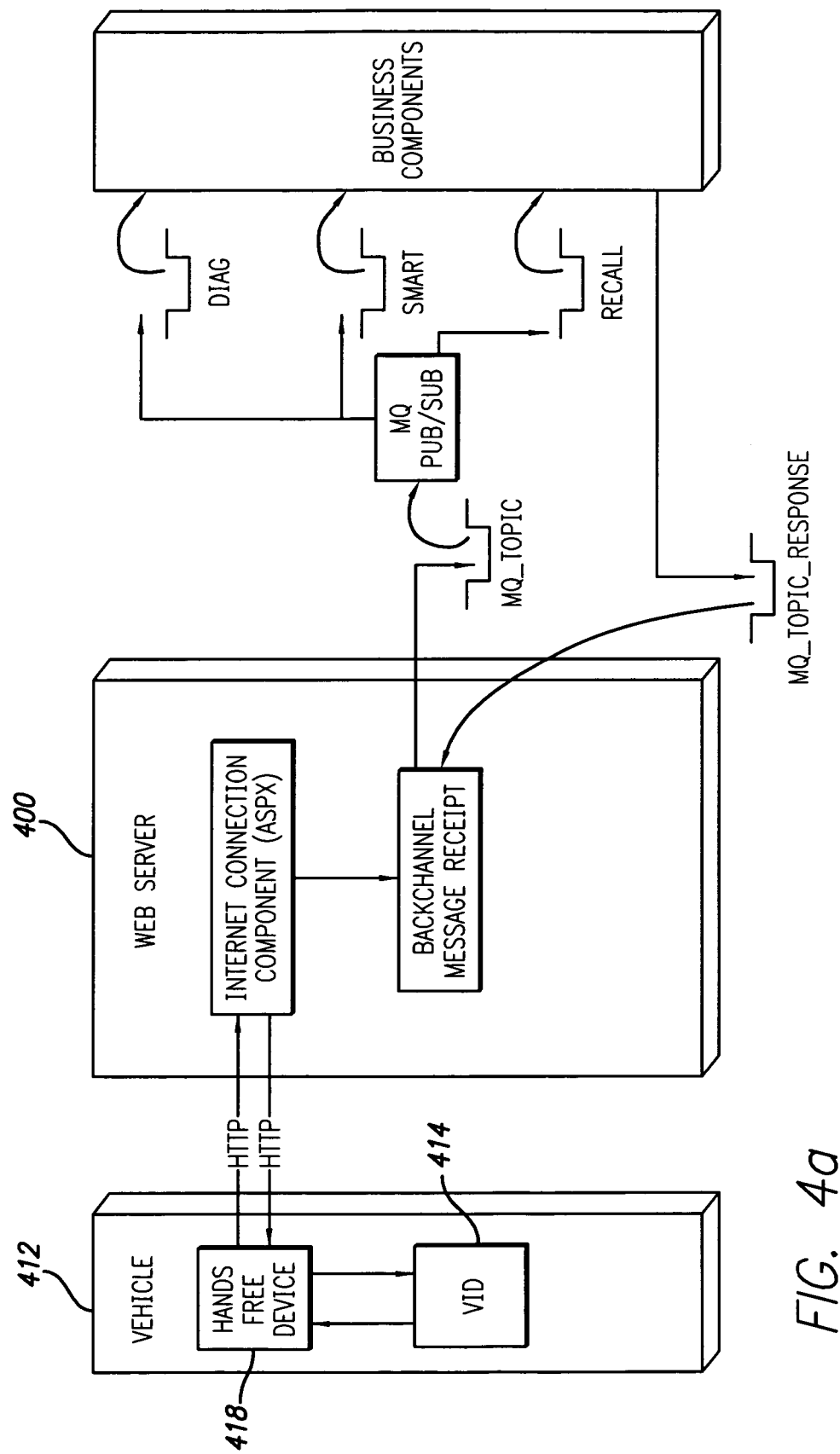
FIGS. 4a-4f are schematic diagrams illustrating various operational details of the embodiments of FIG. 3.

In operation, as shown in FIG. 4a, the remote location 414 via its detection device (e.g., 16, 216 shown in FIGS. 1, 2) detects a problem with the vehicle 412 (e.g., the engine temperature is too high and/or the oil level is too low). The hands-free device 418 requests the driver of the vehicle 412 for permission to contact the remote location 410.

Figure 4B:
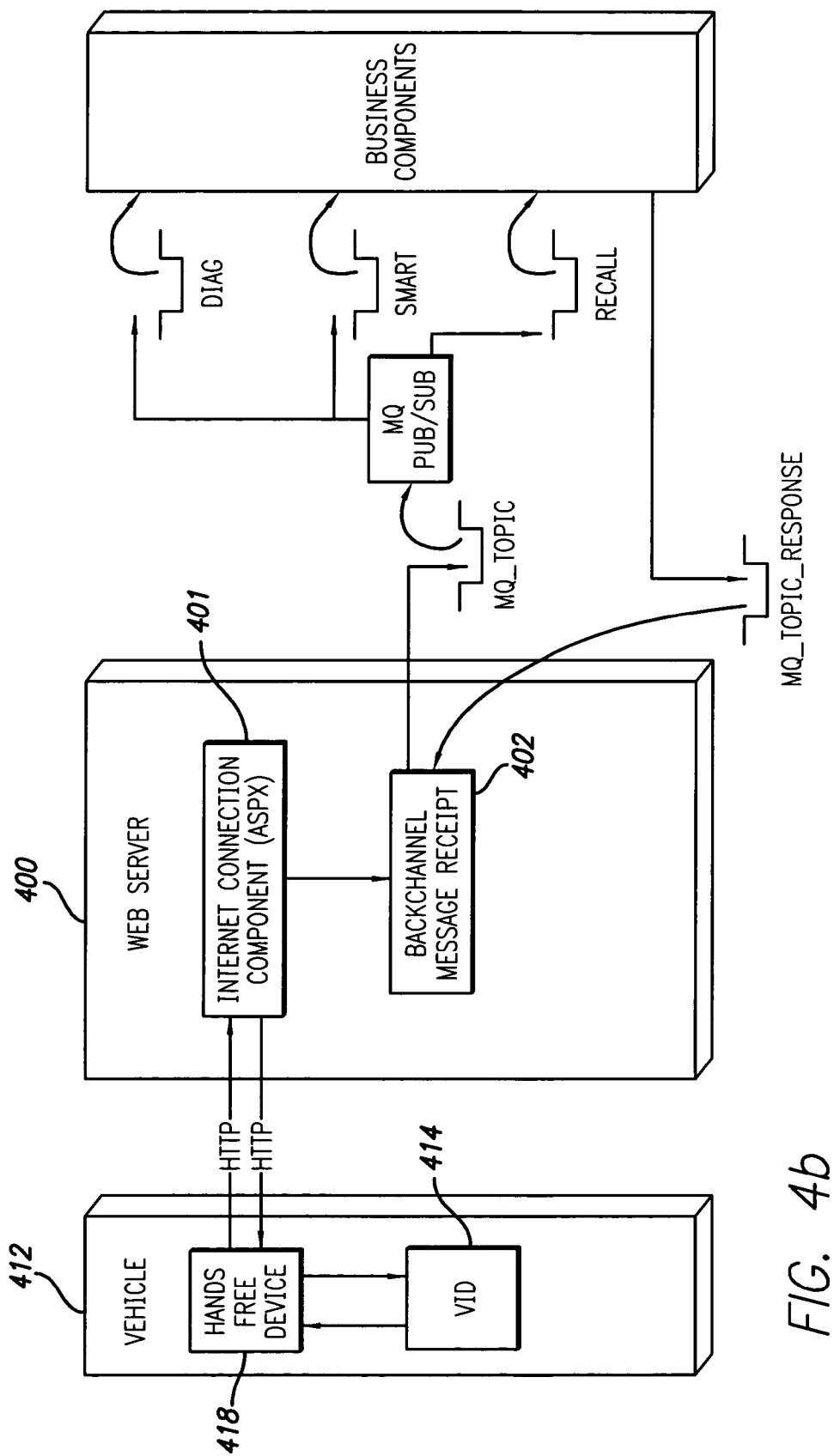

Referring now to FIG. 4b, if the driver indicates a permission to contact the remote location 410, the hands-free device 418 sends a message to the message portal 400 via a network connection component or an Internet connection component, a packet exchange, or asynchronous packet exchange (ASPX) 401. Once the message has been received by the message portal 400, the message portal 400 (e.g., via a backchannel message receipt 402) authenticates the vehicle 412 (e.g., as a vehicle of the back channel network), decrypts an encryption of the message, and/or decodes a binary format of the message.

Figure 4C:
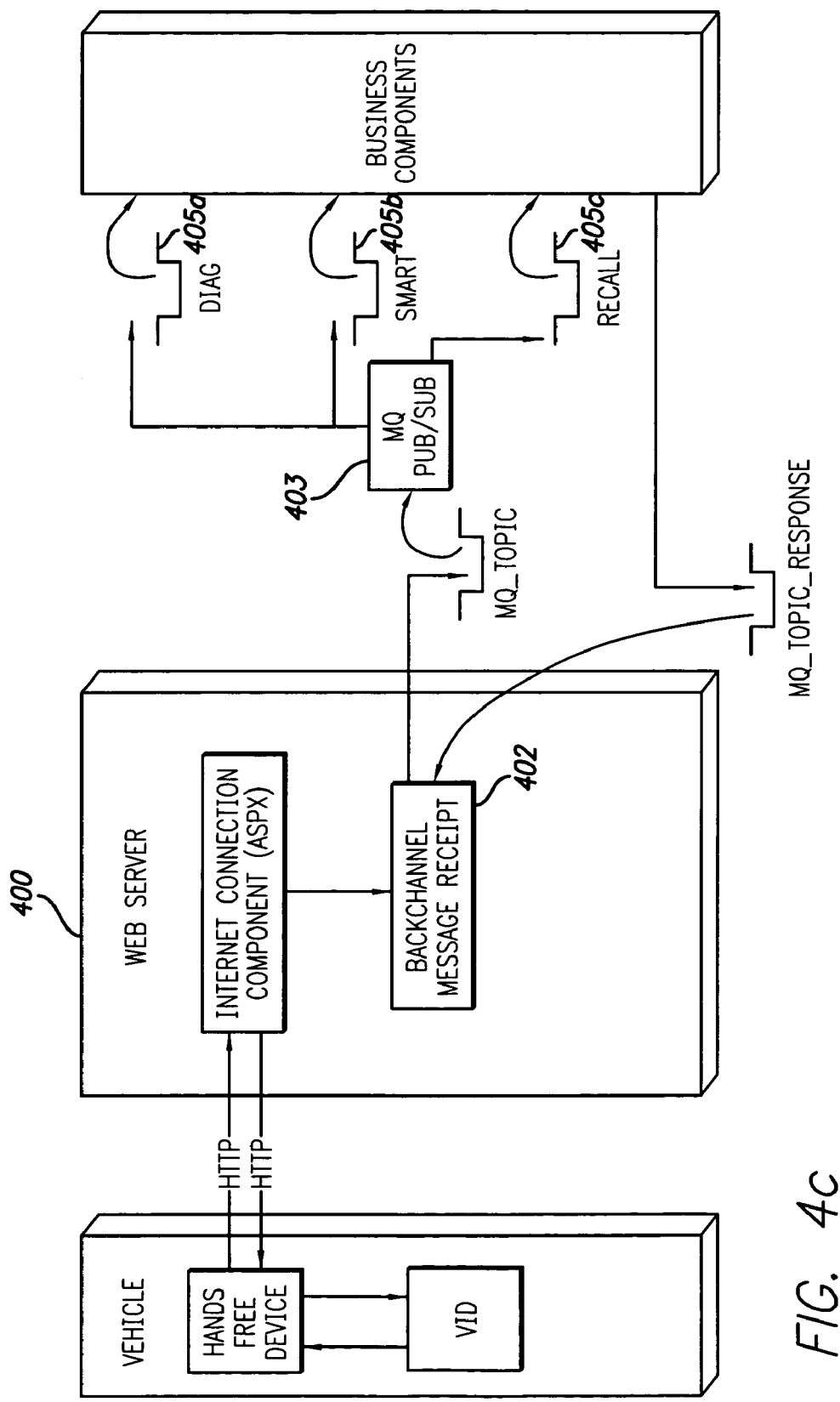

Referring now to FIG. 4c, the message is then sent from the backchannel message receipt 402 of the message portal 400 to a publish/subscribe service 403. The service 403 then publishes the message in a plurality of bins 405a, 405b, 405a. The bins may include a bin 405a for holding vehicle diagnostic messages, a bin 405b for holding recall messages, etc.

Figure 4D:
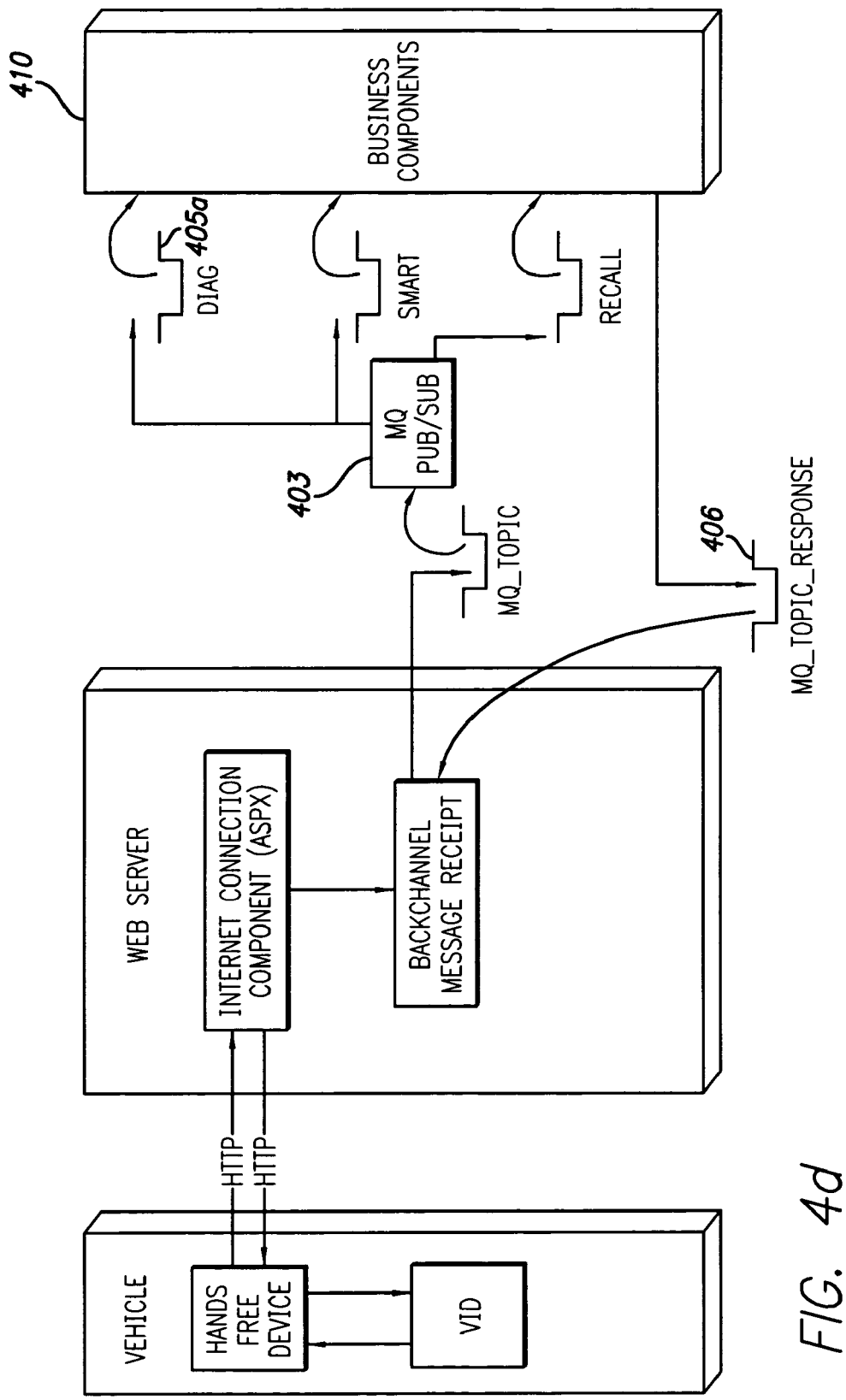

Referring now to FIG. 4d and assuming that the message is a vehicle diagnostic message, the remote system or a business component of the business components 410 that subscribes to diagnostic messages reads the published message in the diagnostic bin 405a. The remote location 410 then looks up information relating or corresponding to the published message and sends a response to the published message from the vehicle 412. In the embodiment of FIG. 4d, the response is sent to a response bin 406.

Figure 4E:
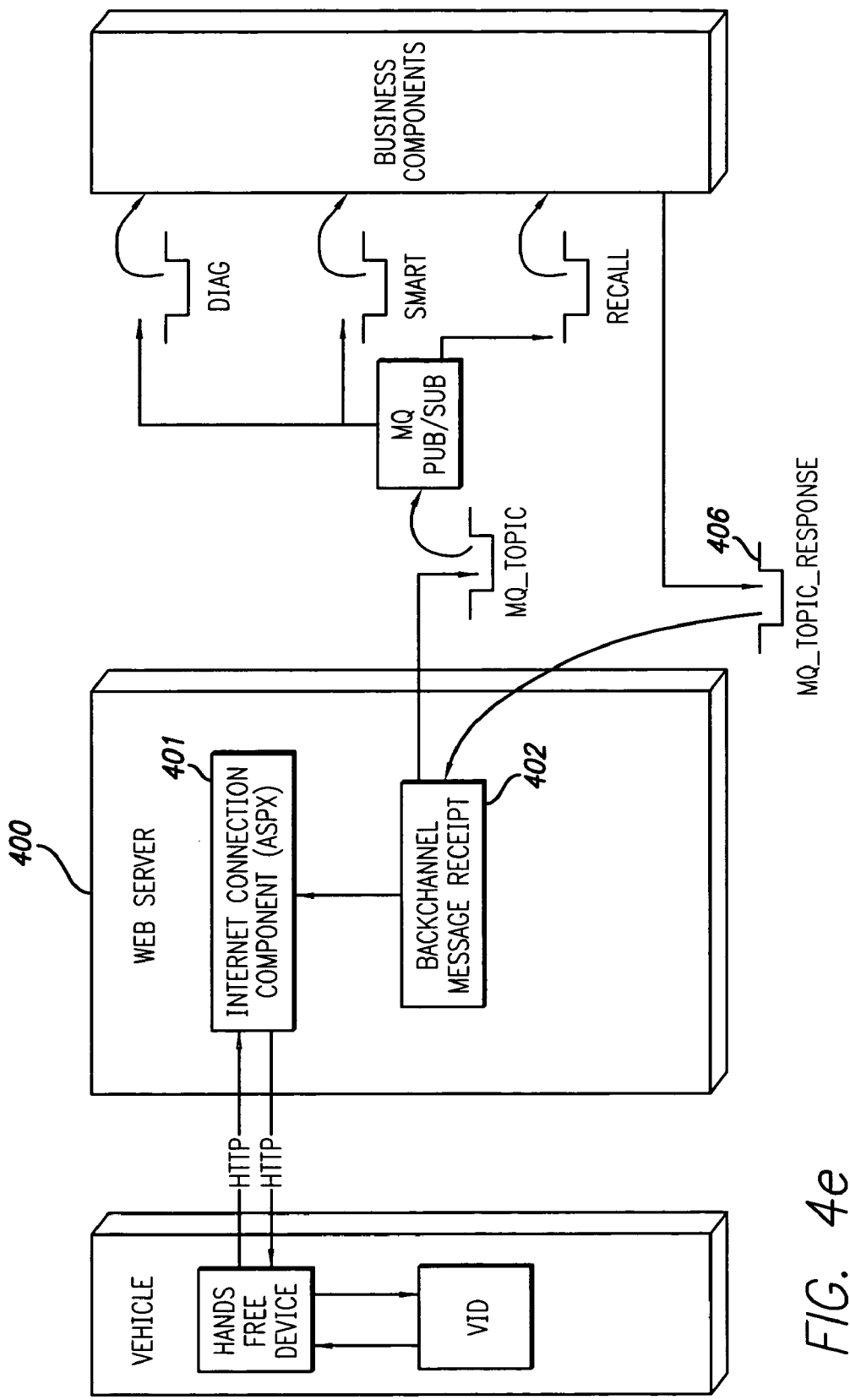

Referring now to FIG. 4e, when the reply message comes to the response bin 406, it is retrieved by the backchannel message receipt 402 of the message portal 400. The reply message is then converted to a binary format and encrypted. The reply message is then sent up to the Internet connection component 401.

Figure 4F:
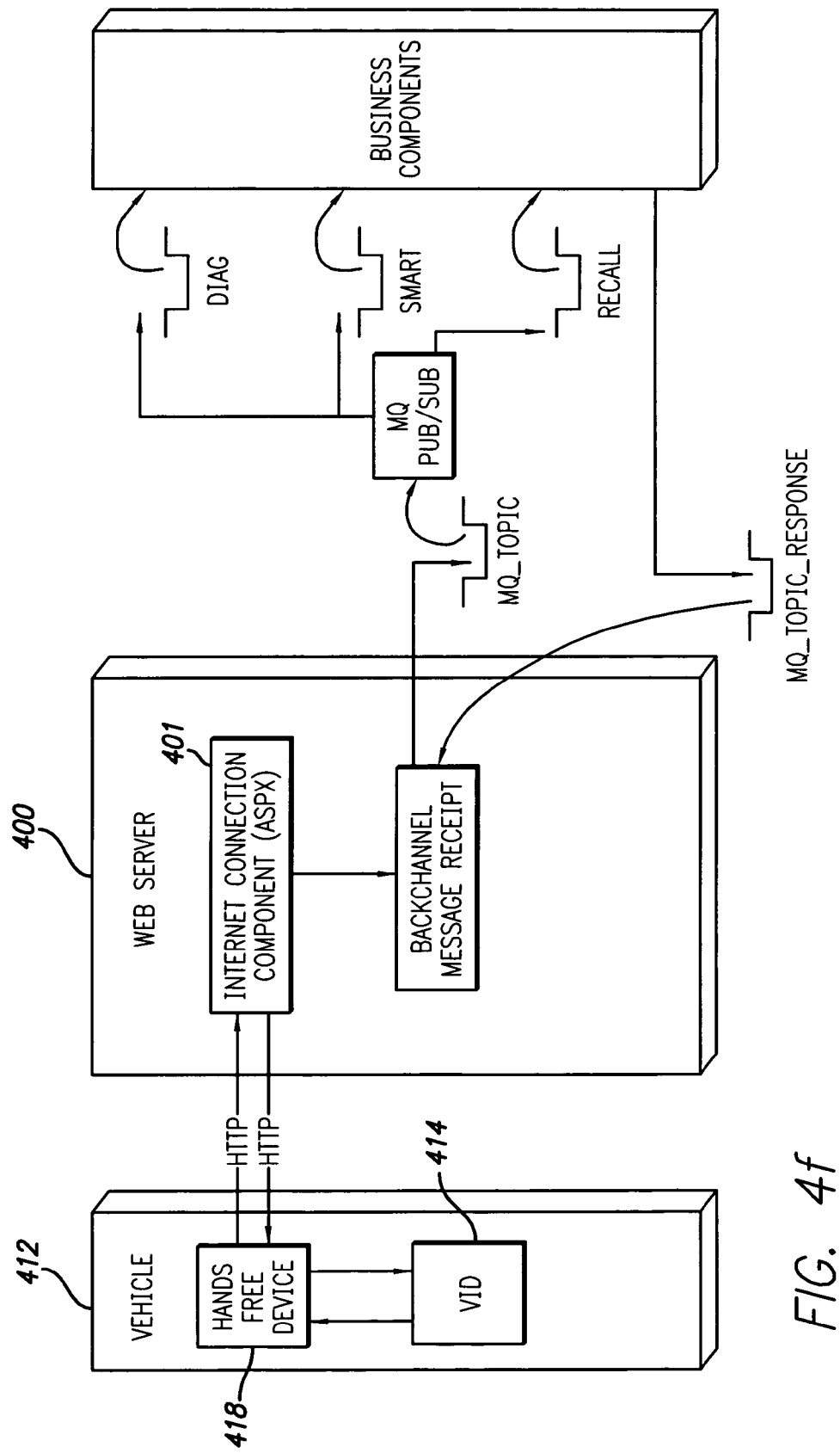

Referring now to FIG. 4f, the reply message is then sent to the vehicle 412 via the Internet connection component 401 and the hands-free device 418. The reply information (e.g., the reply diagnostic information) is then displayed to the driver of the vehicle 412 via the VID 414.

Those skilled in the art will appreciate that the above embodiment for administering and controlling the exchange of information from a remote location to a vehicle is designed to be flexible, so that additional features may be added or modified.

Figure 5:
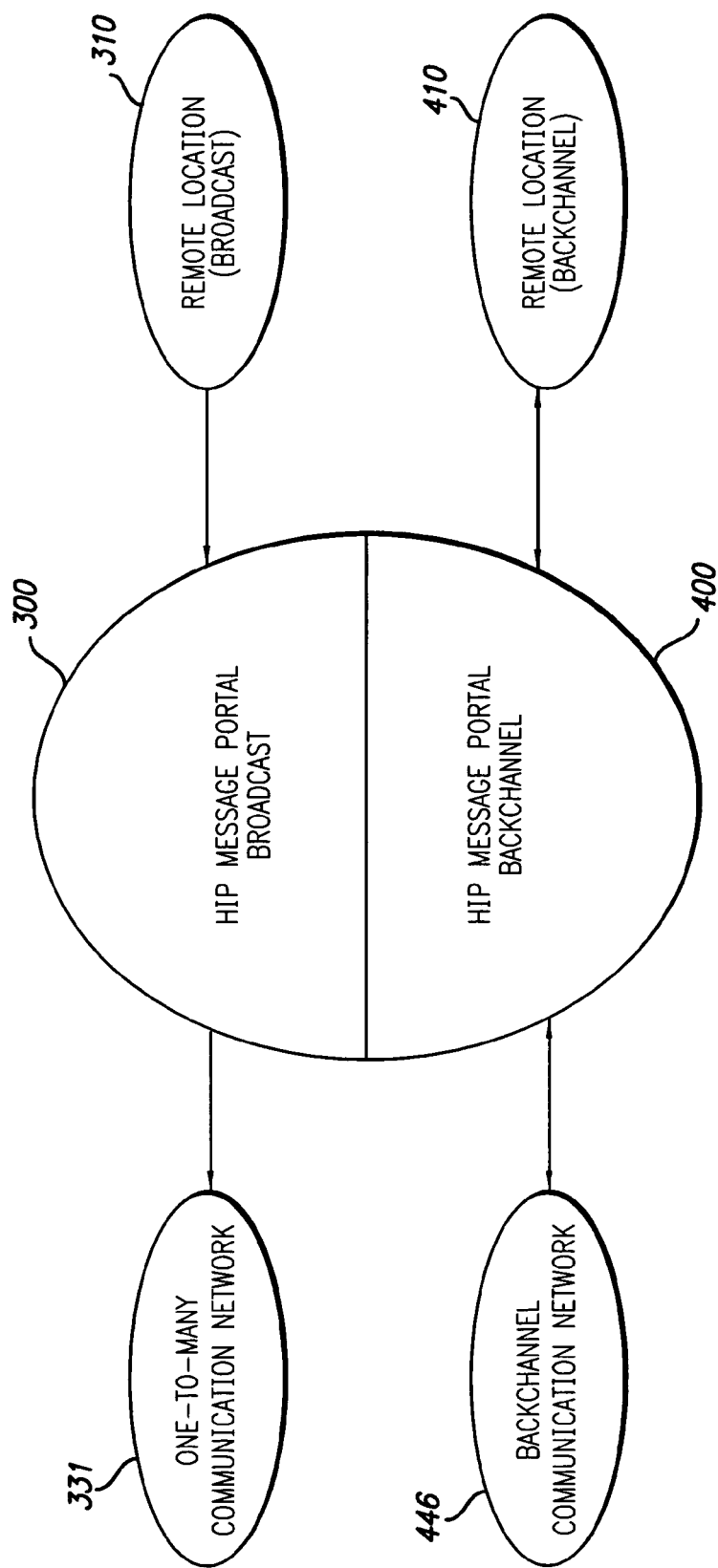
FIG. 5 is a schematic diagram of a further embodiment of an integrated message portal pursuant to aspects of the invention.

Referring now also to FIG. 5, in one embodiment, the message portal 400 of FIG. 4 is a backchannel message portal and the message portal 300 of FIG. 3 is a broadcast message portal. As shown in FIG. 5, the two portals 300, 400 can be interconnected as a single message portal. This single message portal then can: (1) administer and control broadcast messages from a remote location 310 to vehicles via a one-to-many communication network 331; and (2) administer and control two-way communication messages between a remote location 410 and a vehicle via a backchannel communication network 446 (e.g., a wireless communication network 46 shown in FIG. 1). Moreover, it should be appreciated that the above described mechanisms and process for administering and controlling the exchange of information are for purposes of example only and the invention is not limited thereby.

Figure 6:
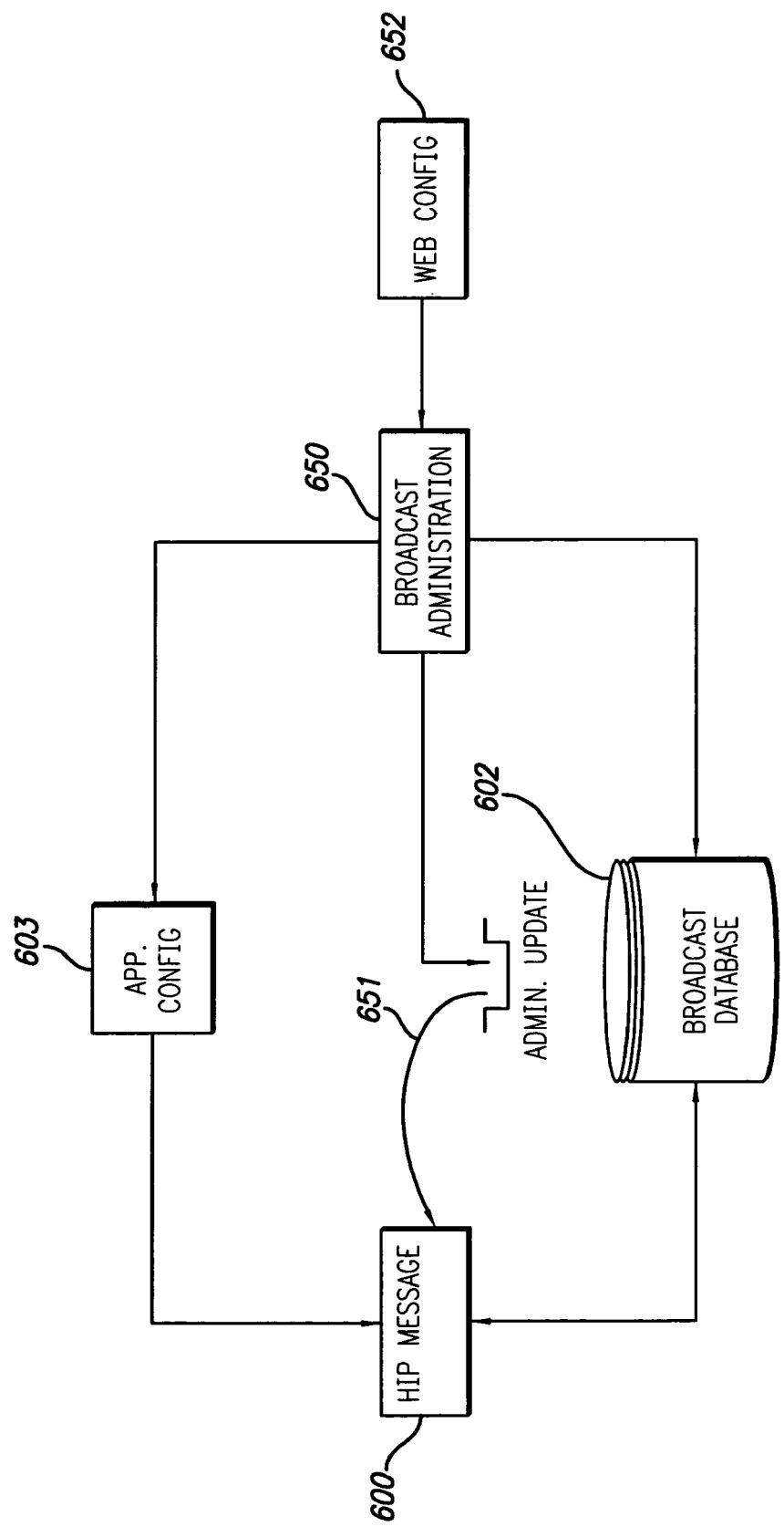
FIG. 6 is a schematic diagram of an embodiment of a broadcast administration application pursuant to aspects of the invention.

FIG. 6 shows an embodiment of a broadcast administration application 650 that is deployed as a series of web pages. Updates are made directly to the broadcast database 602 or configuration file 603. After an update has been made, the broadcast administration application 650 notifies the message portal 600 of the change by sending a notification message through an administration update 651. More specifically, as described above, the message portal 600 (e.g., 300 in FIG. 3 and/or 400 in FIG. 4) is a service or system that administers deliveries of messages to a one-to-many communication network, an XM Radio satellite network, a backchannel communication network, and/or a wireless communication network. The configuration file 603 contains initialization data and scheduler parameters of the message portal 600. The broadcast database 602 (e.g., a SQL server database) contains message data. The administration update 651 (e.g., MQSeries queue) is used to communicate updates to the message portal 600 from the administration application 650. A configuration file 652 (e.g., web.config) is also used with the administration application 650. The configuration file 652 contains initialization data for the administration application 650. In one embodiment, the administration application 650 is used to control a scheduler engine (e.g., the broadcast scheduler 323 and/or the priority queue 324 shown in FIG. 3). Since the administration application 650 is used to control the scheduler engine, it is important that only actual administrators of the message portal 600 can access the application 650. Therefore, a privileged account may be required when using the broadcast administration application 650.

The scheduling engine is responsible for determining the order in which messages are transmitted. It does this through a series of weighting algorithms that compare messages and deterministically select the "next" message to be transmitted. These weighting algorithms rely on weighting factors. The value for these factors can be set by an administrator of the message portal 600. For example, the administrator may use an administration worksheet to show the effect of changing each variable in the scheduler.

The administration worksheet can be any worksheet known to those skilled in that art (e.g., Microsoft Excel®) that can assist the administrator to determine what values are required and then enter these values through the broadcast administration application 650. It is intended that an administrator would use the administration worksheet to determine the values that are required and then enter these values through the broadcast administration application 650 (e.g., though a website of application 650). Specifically, there should be a worksheet for weighting overdue message (see FIG. 7); for weighting categories of broadcast messages (see FIG. 8); for weighting service levels of the broadcast messages (see FIG. 9); for weighting current saturation and saturation targets (see FIGS. 10-11); and/or for providing expect results of changes in weights of a message (see FIG. 12). It is within the scope and spirit of the invention to include other worksheets.

Figure 7:
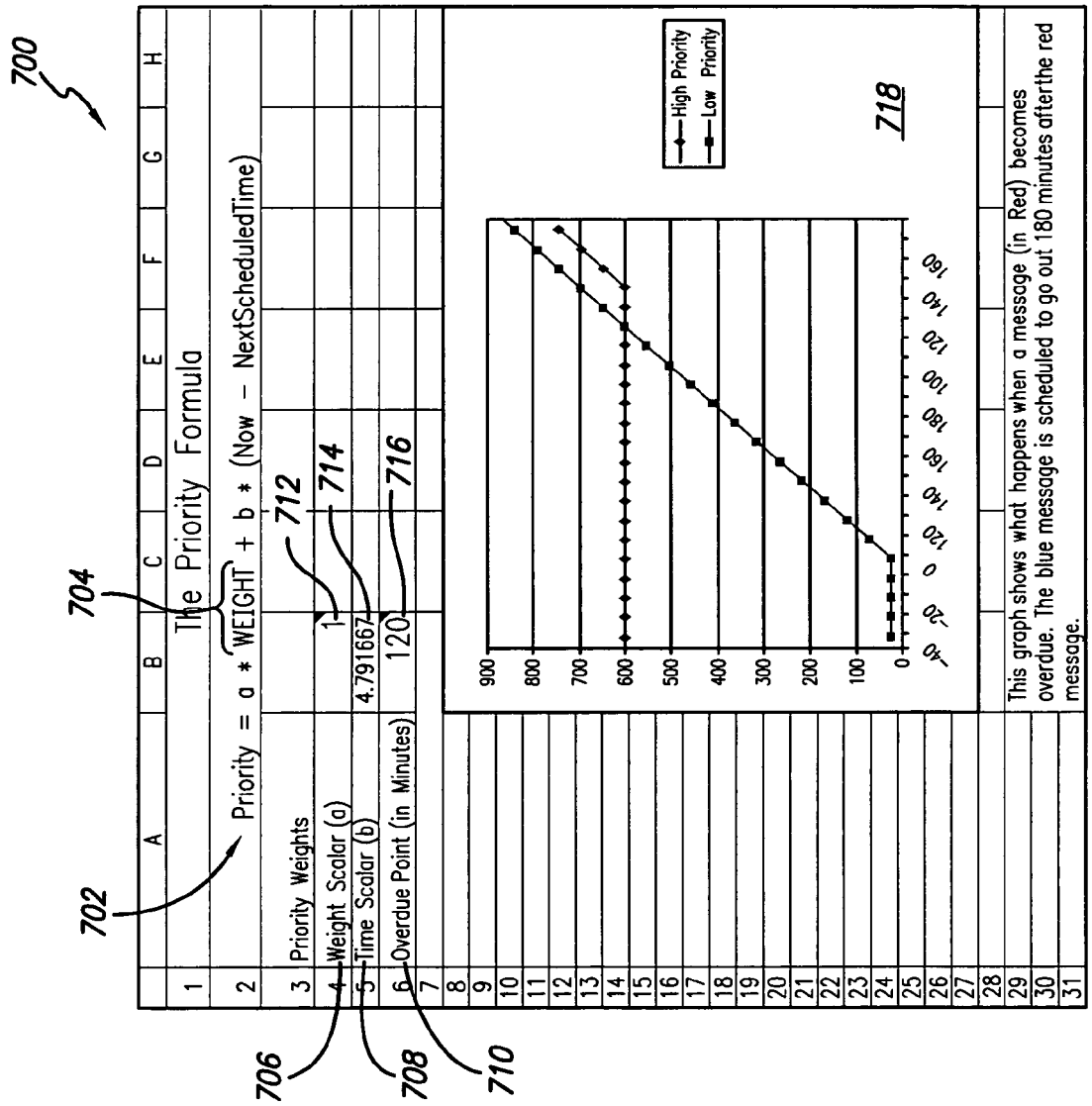
FIG. 7 is screen shot of a Priority Formula worksheet pursuant to aspects of the invention.

FIG. 7 illustrates an embodiment of a Priority Weights worksheet 700. The worksheet 700 identifies a priority algorithm 702 that calculates the sending priority for a specific message. In the FIG. 7 embodiment, the priority algorithm 702 comprises:

$$\text{Priority} = a^*\text{WEIGHT} + b^*(\text{Now} - \text{NextScheduledTime})$$

The worksheet 700 allows a user to designate a weight scalar 706, a time scalar 708 and a overdue point 710. For example, a value may be specified for the weight scalar 706 by entering a value into the corresponding cell 712. Similarly, the user may designate a value for the time scalar 708 and the overdue point 710 by entering a value into the cells 714 and 16, respectively. The effect of entering each of these values is demonstrated visually on the worksheet 700 by a graph 718.

Figure 8:
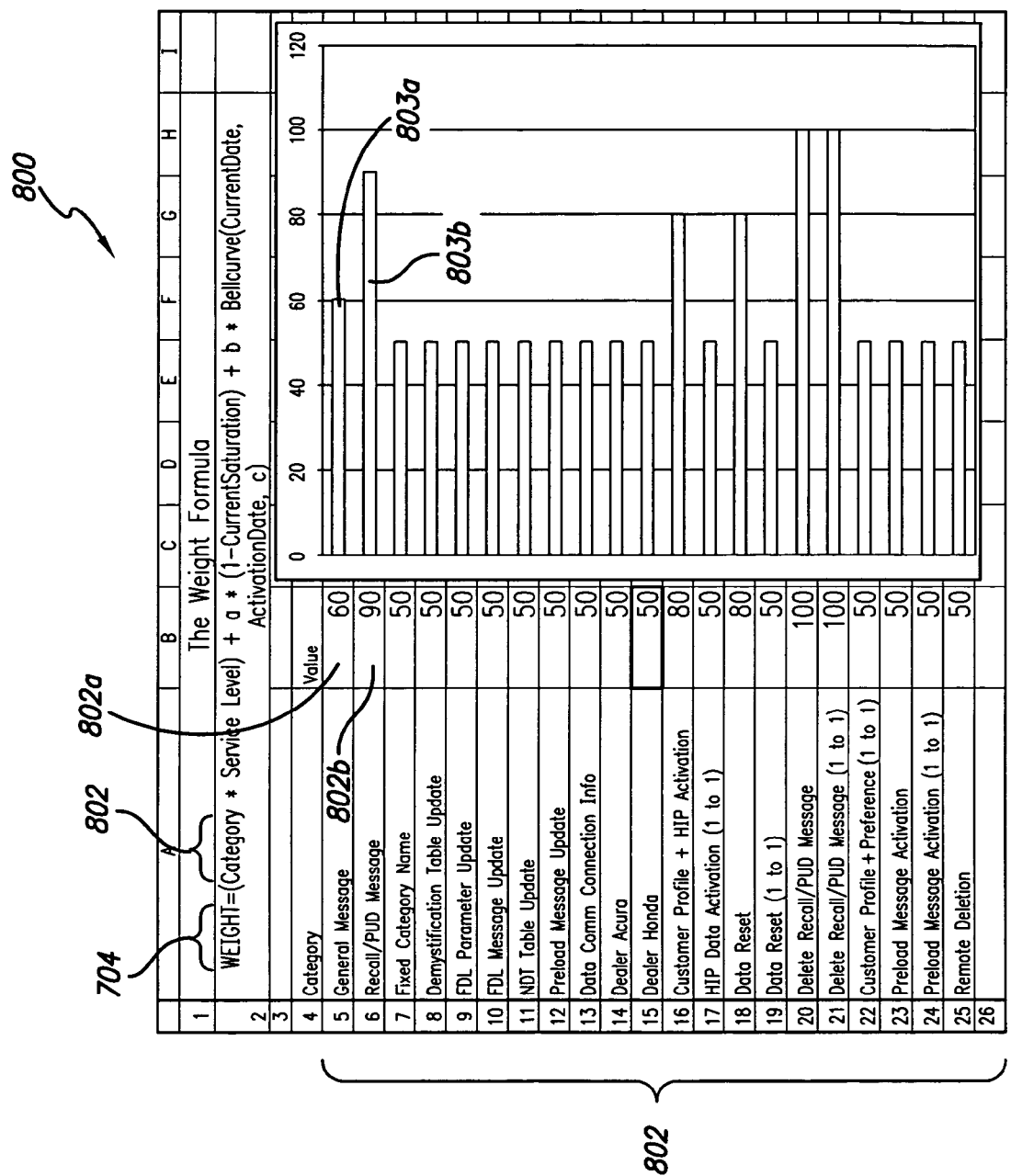
FIG. 8 is a screen shot of a Weight Formula worksheet illustrating categories pursuant to aspects of the invention.
Figure 9:
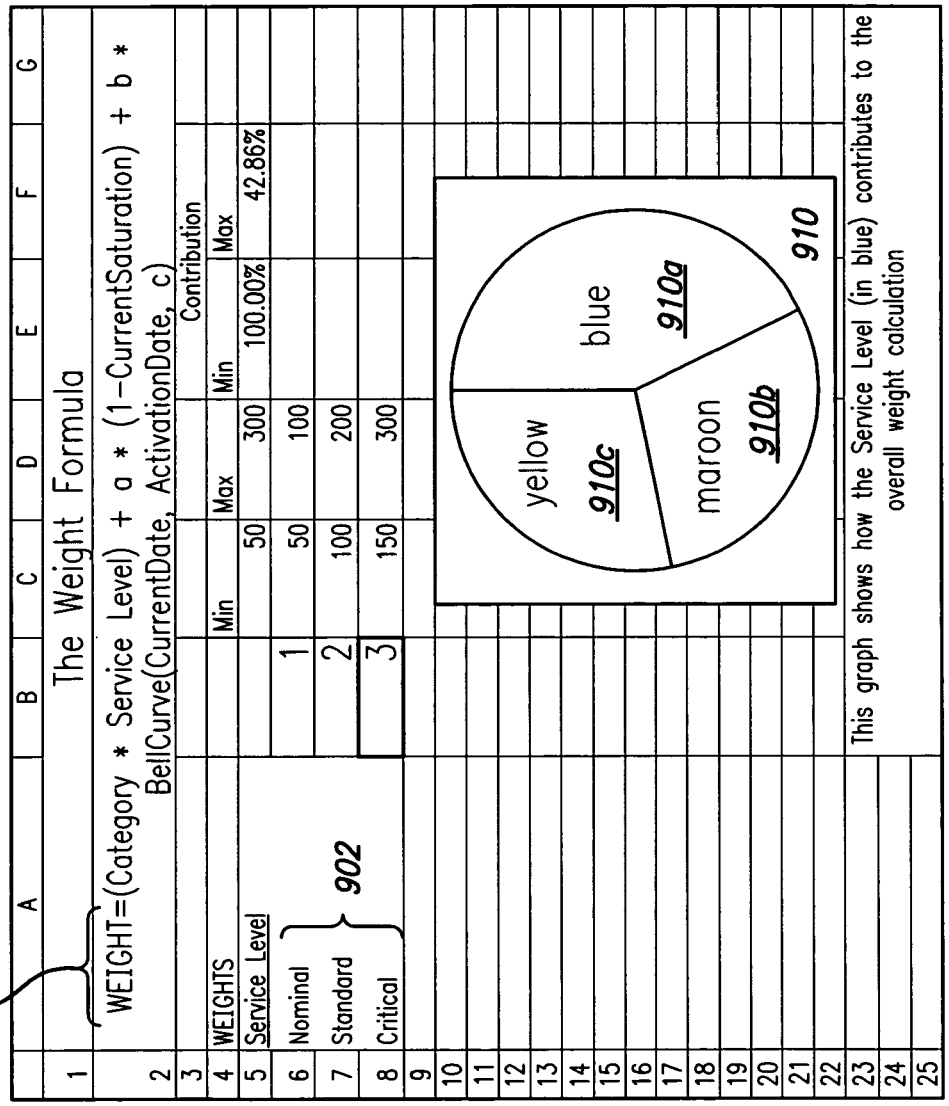
FIG. 9 is a screen shot of another Weight Formula worksheet illustrating service levels pursuant to aspects of the invention.
Figure 10:
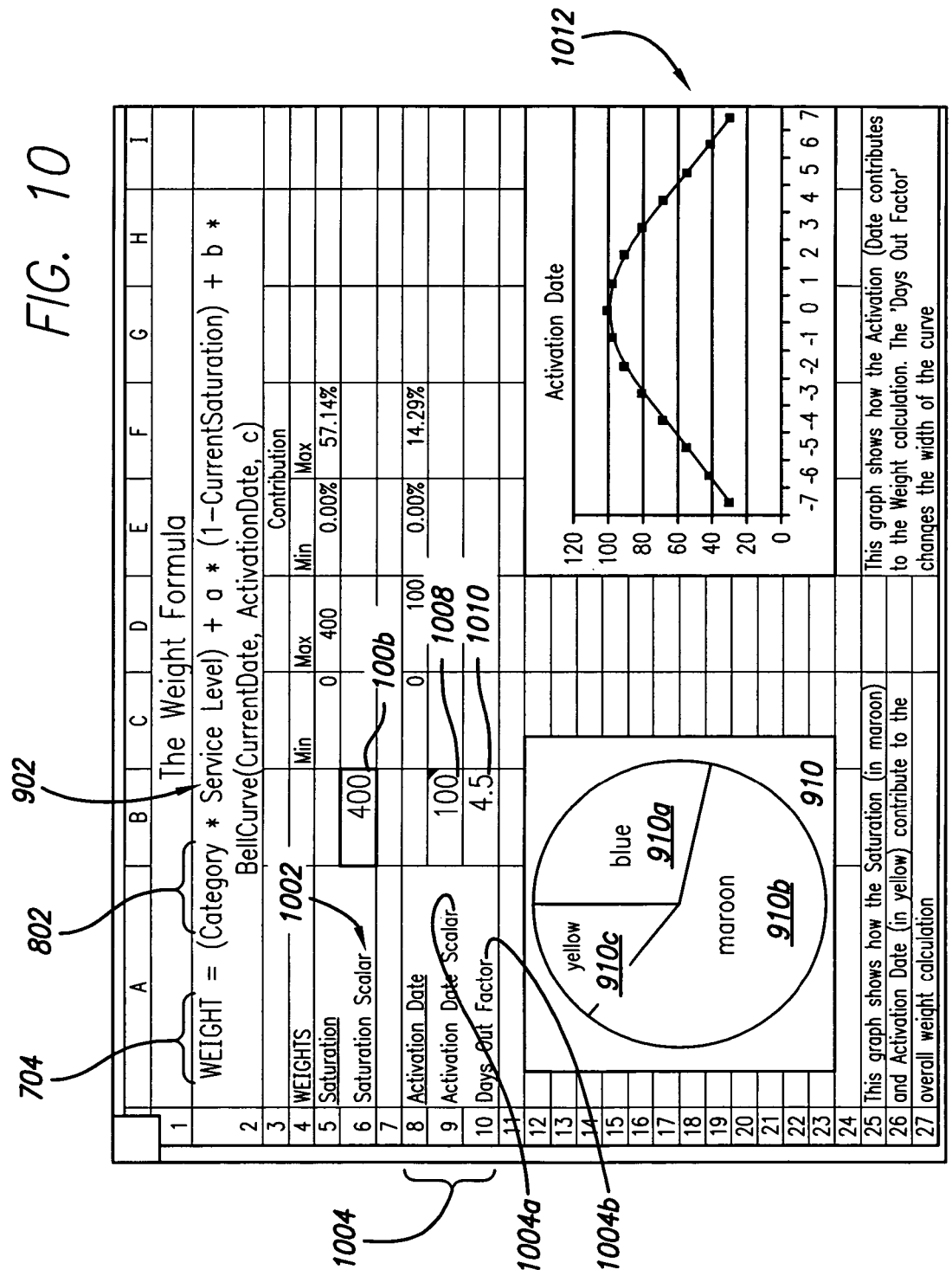
FIG. 10 is a screen shot of yet another Weight Formula worksheet illustrating saturation levels pursuant to aspects of the invention.

FIGS. 8-10 illustrate that the WEIGHT variable 704 of the priority algorithm 702 comprises another algorithm. In one embodiment, the WEIGHT variable 704 comprises:

$$\text{WEIGHT} = (\text{Category}^*\text{ServiceLevel}) + a^*(1 - \text{Current-Saturation}) + b^*\text{BellCurve (CurrentDate, ActivationDate, } c)$$

FIG. 8 illustrates a category worksheet 800. In this worksheet, each category 802 may be assigned a specific value. For example, the General Message category may be assigned a value of 60 by entering the value into the cell 802a, while the Recall/PUD Message category may be assigned a value of 90 by entering the value into the cell 802b. In other words, each category can be assigned a specific value by entering the value into the respective cell. In this embodiment, each category may be assigned a value between zero (not very important) and one hundred twenty (very important). It is within the scope of the present invention to include other categories than those shown in FIG. 8 and use other value scales. The worksheet 800 also provides a bar graph 810 to visually display the values set for each category 802.

FIG. 9 illustrates a service level worksheet 900. In this worksheet, the Administrator can set the range for each of the three service levels 902—nominal, standard and critical.

Each ServiceLevel variable (e.g., 1, 2 and 3) corresponds to these minimum and maximum values set by the Administrator. In this embodiment, the critical service level category 902 has a higher value than the nominal service level to emphasize that service is critical (e.g., higher WEIGHT variable 704). The Fig. embodiment also includes a visual display 910 to illustrate the ServiceLevel variable 902 contributes to the WEIGHT variable 704 compared to the saturation variable 1002 and the activation date variable 1004a. For example, FIG. 9 illustrates that the ServiceLevel variable 902, with the settings shown in FIG. 9, contributes approximately forty percent of the WEIGHT variable 704 while the saturation variable 1002 and activation date variable 1004a each contribute approximately 24 percent.

FIG. 10 illustrates a CurrentSaturation worksheet 1000. This worksheet allows an Administrator to set the saturation scalar variable 1002 and the activation date scalar variable 1004a in the WEIGHT algorithm 704. The values for the saturation scalar variable 1002, the activation date variable 1004a and the days out factor variable 1004b are entered into the worksheet by entering a value into the cells 1006, 1008 and 1010 respectively. The worksheet 1000 may also include the visual display 910. FIG. 10 illustrates that, in this embodiment, the saturation scalar variable 1002 contributes approximately sixty percent, the Activation Date scalar variable 1004a contributes approximately ten percent of the WEIGHT variable and the service level variable 902 contributes approximately thirty percent. The worksheet 1000 may also include an activation date graph 1012 displaying how the activation date scalar variable 1004a contributes to the WEIGHT calculation.

Figures 11, 12:
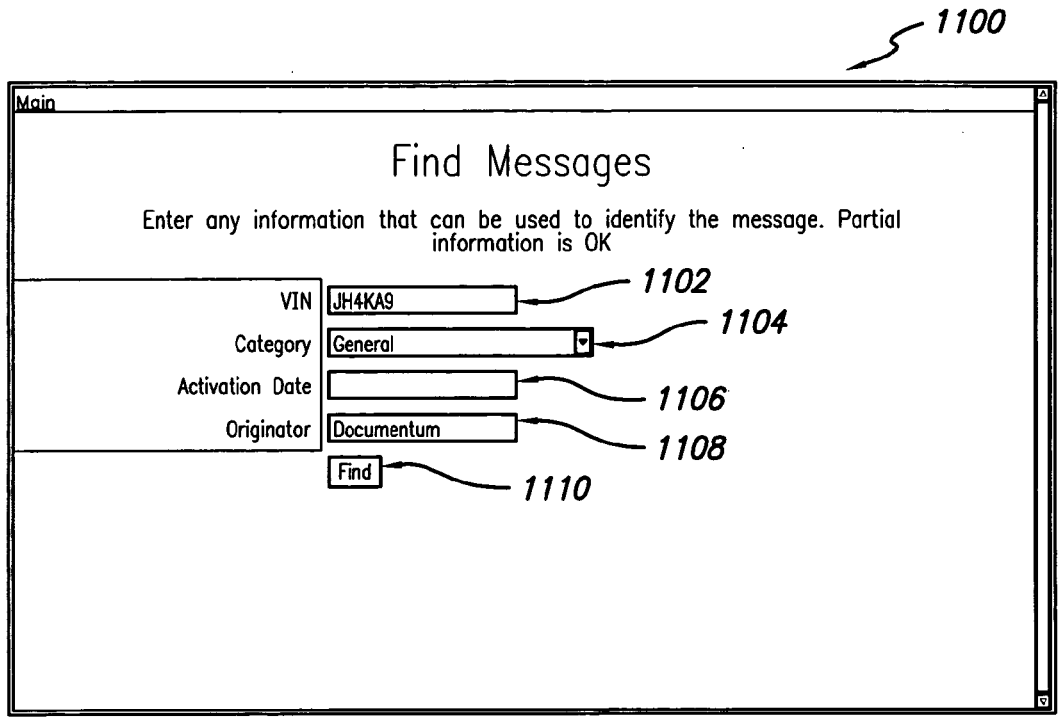
FIG. 11 is a screen shot of a Find Messages menu pursuant to aspects of the invention.
FIG. 12 is a screen shot of an Available Messages menu pursuant to aspects of the invention.

Moreover, the broadcast administration application 650 should provide a user interface to search for and view messages associated with the various actions that an administrator can perform. For example, the user interface can include a find message interface 1100 that allows a user to locate a message. FIG. 11 illustrates one example of a Find Messages screen 1100. This screen 1100 provides a search tool for a user (e.g., driver) to locate messages. The FIG. 11 embodiment provides a text box 1102 for entering a partial or complete vehicle identification number (VIN), a drop-down list 1104 for selecting a specific category, a text box 1106 for entering the activation date and a text box 1108 for entering an originator designation. Entering all or some of this information filters the list of available messages according to the specific field. After entering all or some of this information, the user may select the "find" button 1110 so that the application 650 may apply these filters to the available messages.

FIG. 12 illustrates an available message screen 1200. Upon selecting the find button 1110, the system retrieves all messages that meet the specified criteria. The FIG. 12 embodiment illustrates the following information about each displayed message: (1) identification number (ID) 1202, (2) category 1204, (3) received date 1206, (4) status 1208, (5) originator 1210, (6) activation date 1212, (7) expiry date 1214 and (8) service level 1218. Each ID 1202 shown in the available messages screen 1200 preferably comprises a hyperlink, that if touched or selected by the user, will bring up the specific message on a single message screen 1300.

Figure 13:
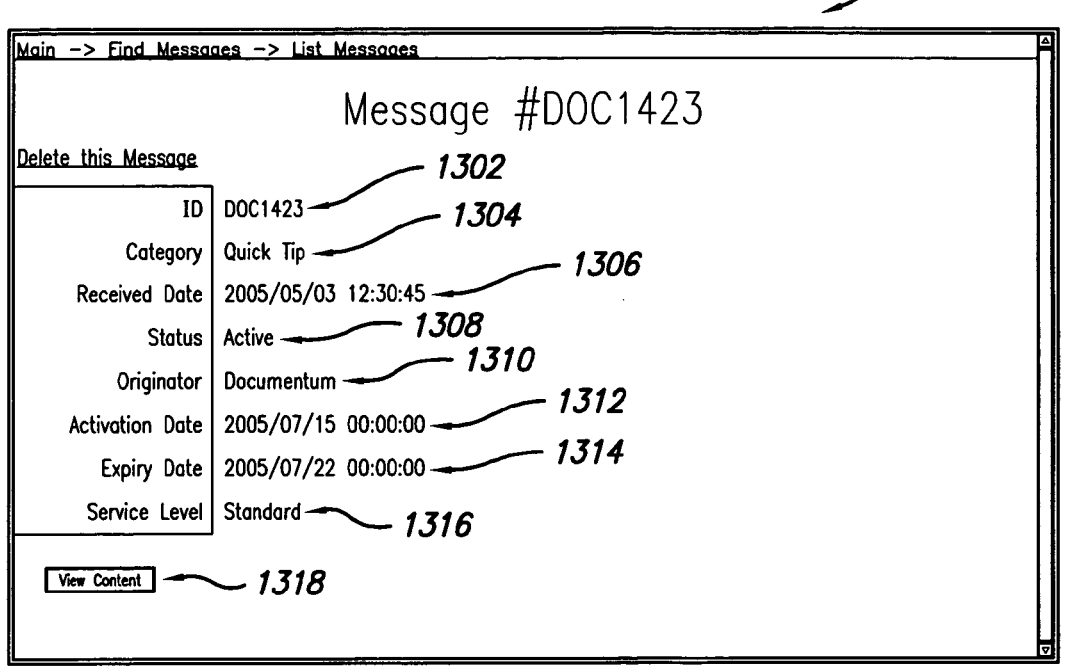
FIG. 13 is a screen shot of a Single Message pursuant to aspects of the invention.
Figure 14:
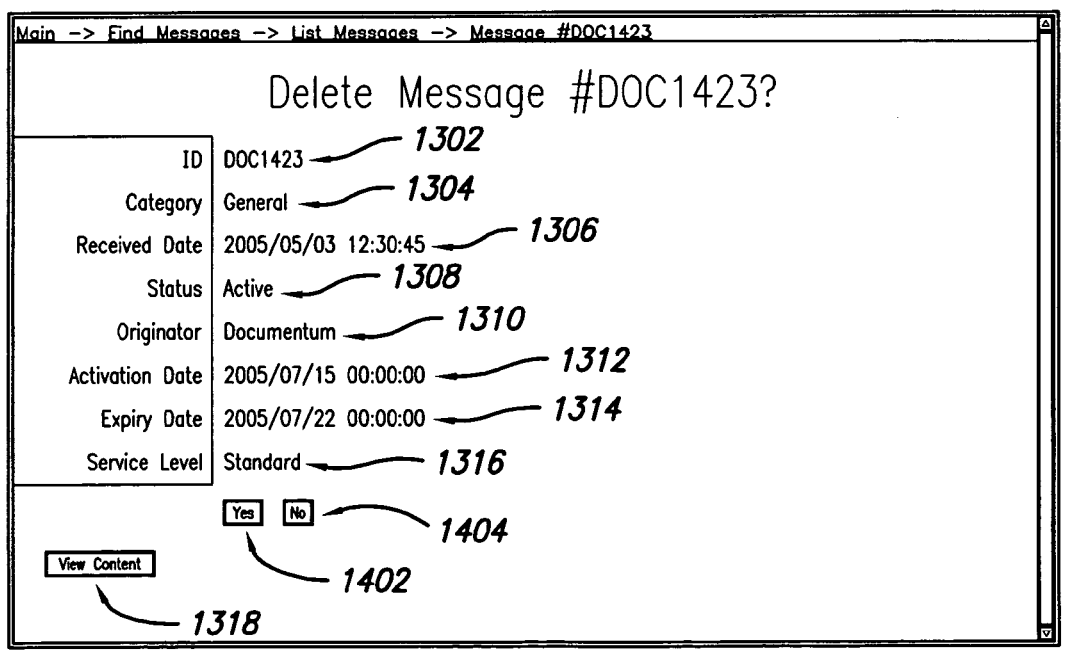
FIG. 14 is a screen shot of a Delete Message menu pursuant to aspects of the invention.

FIG. 13 illustrates one embodiment of a single message screen 1300. This screen 1300 provides the user with the specific details of the selected message. The single message screen 1300 provides the opportunity to view more detailed information about this message or delete the message. If the user selects the "delete this mesage" hyperlink, the system asks the user to confirm deletion of this message. By pressing the "yes" button 1402 on the delete message screen 1400, the message is deleted from the application 550.

Figure 15:
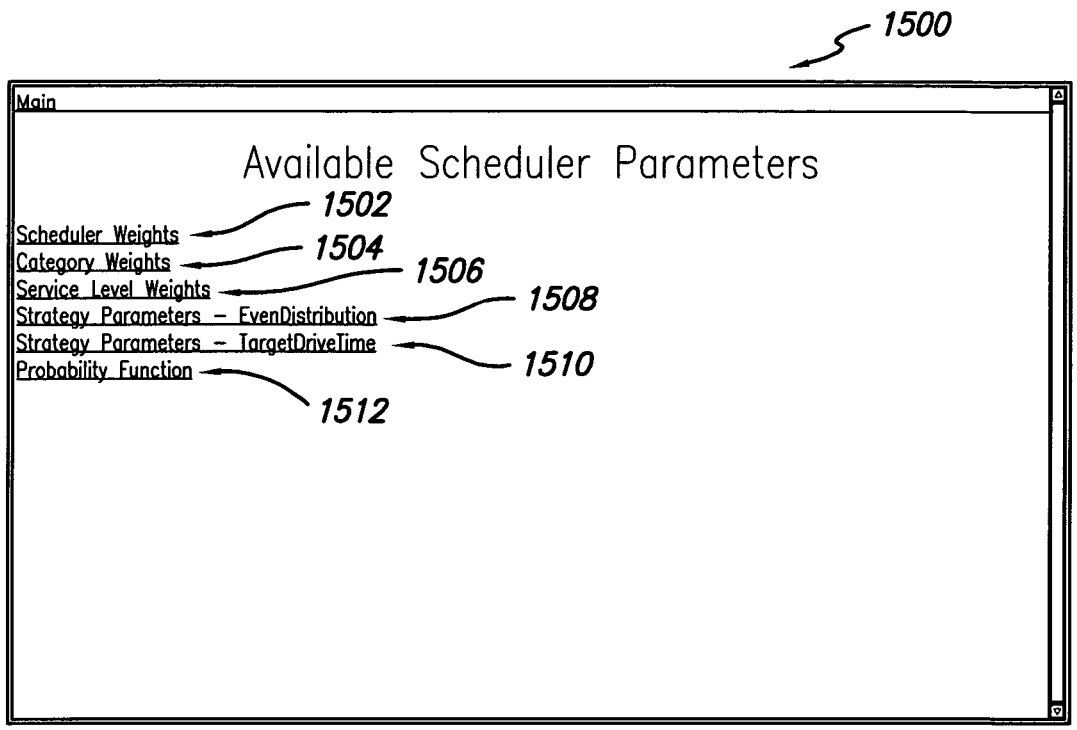
FIG. 15 is a screen shot of an Available Scheduler Parameters menu pursuant to aspects of the invention.
Figure 16:
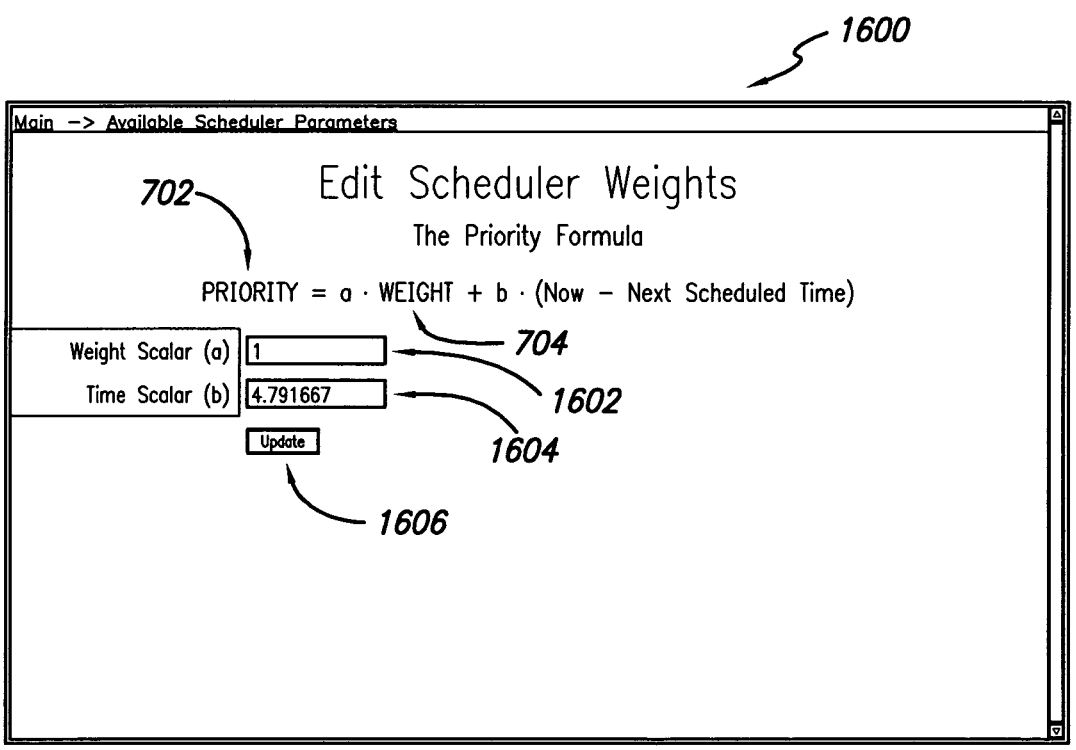
FIG. 16 is a screen shot of an Edit Scheduler Weights menu pursuant to aspects of the invention.

FIG. 15 illustrates an available scheduler parameter interface 1500 that lists the aspects of the scheduling engine that can be updated. The interface 1500, in this embodiment, includes six hyperlinks to chose from: (1) Scheduler Weights 1502, (2) Category Weights 1504, (3) Service Level Weights 1506, (4) Strategy Parameters—Even Distribution 1508, (5) Strategy Parameters—Target Drive Time 1510 and (6) Probability Function 1512. Each of these hyperlinks allows the user to update a specific aspect of one of the algorithms previously shown in FIGS. 7-10. FIG. 16 illustrates the edit scheduler weights screen 1600. In this screen 1600, the WEIGHT scalar variable 704 may be revised to update the PRIORITY algorithm 702. By entering a new number into the text box 1602 and selecting the "update" button 1606, the WEIGHT variable 704 is updated in the Scheduler section and a message is displayed that the WEIGHT variable has been changed. Similar update screens are available for updating the categories shown in FIG. 8, the service levels, saturation levels and so on.

An available strategy interface can also be included in the user interface of the administration application 650. In the scheduling engine, a strategy determines when to schedule a message for transmission. It can depend on many different factors, each customizable to the individual strategy. An available strategy parameter interface can be included to allow the user to choose which part of the strategy to modify. An edit strategy weight interface can be included to allow the user to customize the strategy parts of the weight formula. This formula is used by the scheduler to determine the importance of a message.

An edit service level target interface can be included. A key component of each strategy is calculating how often to broadcast or transmit a message. This depends on how quickly the message should reach "everyone" (e.g., all subscribed vehicles) or "someone" (e.g., a particular subscribed vehicle). The edit service level target interface allows the user to specify these values. Moreover, the user interface of broadcast administration application 650 can include an edit probability function interface. Another key component of the scheduler engine is the concept of "saturation." In order to calculate saturation, the engine has to have a distribution function of the assumed number of cars on the road at any given interval. In one embodiment, this data can be made available from the U.S. Department of Transportation.

Having thus described a preferred embodiment of a method and system for administrating the exchange of services and information between a vehicle and a remote location, it should be apparent to those skilled in the art that certain advantages of the within system have been achieved. It should also be appreciated that various modifications, adaptations, and alternative embodiments thereof may be made within the scope and spirit of the present invention. For example, the use of broadcast communication networks has been illustrated, but it should be apparent that many of the inventive concepts described above would be equally applicable to the use of other non-broadcast communication networks.

What is claimed is:

1. A server including a message portal for administering and controlling the exchange of vehicle-related messages between a remote location and a vehicle, comprising:

a message receipt service for receiving messages sent from the remote location;

a broadcast scheduler for determining when each message received by said message receipt service should be broadcast to a vehicle;

a priority queue device for using a priority algorithm comprising a weight portion and a time portion to determine, as each message is received, an order in which each message should be broadcasted to the vehicle;

a dispatcher device for controlling when messages, stored in the priority queue, may leave the priority queue; and an encoding device for encoding messages that have left said priority queue and broadcasting the encoded message to the vehicle;

wherein said weight portion further comprises at least one weighting algorithm, and wherein a hardware processor executes the priority algorithm, the priority algorithm calculating a sending priority for each message as:

Sending Priority=$a$*WEIGHT+$b$*(Now−NextScheduledTime), where
   $a$=a weight scalar,
   $b$=a time scalar,
   (Now−NextScheduledTime)=an overdue point duration, and WEIGHT=(Category*ServiceLevel)+$a'$*(1−CurrentSaturation)+$b'$*Bellcurve(CurrentDate, ActivationDate, $c$), where
   Category=an assigned value of relative category importance,
   ServiceLevel=an assigned value of relative service criticality,
   $a'$=a saturation scalar,
   CurrentSaturation=a number of cars on a road at a given interval,
   $b'$=activation date scalar,
   CurrentDate=a current date,
   ActivationDate=an activation date, and
   $c$=a days out factor.

2. The server as recited in claim 1, wherein the server operates and displays an administration worksheet through which a user enters the saturation scalar, which is associated with a saturation of vehicles in motion.

3. The server as recited in claim 1, wherein the server operates and displays an administration worksheet through which a user enters the activation date scalar.

4. The server as recited in claim 1, wherein the server operates and displays an administration worksheet through which a user enters the time scalar.

5. The server as recited in claim 1, wherein said encoding device converts each message into a format compatible with the vehicle that will receive the message.

6. The server as recited in claim 1, wherein said encoding device comprises a plurality of chunkers that divide the message into a plurality of packets.

7. The server as recited in claim 6, wherein said plurality of packets are broadcast to the vehicle.

8. The server as recited in claim 1, wherein the encoding device broadcasts the message to the vehicle via a satellite broadcast network.

9. The server as recited in claim 1, further comprising a source data cache for storing part of or an entire message for further broadcasting.

10. The server as recited in claim 1, further comprising a broadcast service for logging the time each message was broadcast by said encoding device, and conveying log information to said broadcast scheduler.

11. A method of utilizing a server including a message portal for administering and controlling the exchange of messages between a remote location and a vehicle, comprising the steps of:
   (a) receiving messages from the remote location;
   (b) determining as each message is received and in accordance with a priority algorithm comprising a weight portion and a time portion when each message received in said step (a) should be broadcast to a vehicle;
   (c) prioritizing each of the messages according to the determination in said step (b);
   (d) converting the messages into a format readable by the vehicle; and
   (e) broadcasting each message converted in said step (d) to the vehicle via a one-to-many communication network and according to the priority set in said step (c);

wherein said weight portion further comprises at least one weighting algorithm, and wherein the priority algorithm calculates a sending priority for each message as:

Sending Priority=$a$*WEIGHT+$b$*(Now−NextScheduledTime), where
   $a$=a weight scalar,
   $b$=a time scalar,
   (Now−NextScheduledTime)=an overdue point duration, and WEIGHT=(Category*ServiceLevel)+$a'$*(1−CurrentSaturation)+$b'$*Bellcurve(CurrentDate, ActivationDate, $c$), where
   Category=an assigned value of relative category importance,
   ServiceLevel=an assigned value of relative service criticality,
   $a'$=a saturation scalar,
   CurrentSaturation=a number of cars on a road at a given interval,
   $b'$=activation date scalar,
   CurrentDate=a current date,
   ActivationDate=an activation date, and
   $c$=a days out factor.

12. The method as recited in claim 11, wherein receiving messages in said step (a) comprises:
   (i) receiving a message from the remote location;
   (ii) verifying that the message received in said step (i) is sent from the remote location; and
   (iii) saving the message received in said step (i) based at least in part on whether the message is verified as sent from the remote location in said step (ii).

13. The method as recited in claim 11, displaying on a computer display screen an administration worksheet through which a user enters values of relative message category importance for a plurality of message categories.

14. The method as recited in claim 11, displaying on a computer display screen an administration worksheet through which a user enters values of relative service criticality for a plurality of ServiceLevels.

15. The method as recited in claim 11, displaying on a computer display screen an administration worksheet through which a user enters the saturation scalar.

16. The method as recited in claim 11, displaying on a computer display screen an administration worksheet through which a user enters the activation date scalar.

17. The method as recited in claim 11, displaying on a computer display screen an administration worksheet through which a user enters the time scalar.

18. The method as recited in claim 11, wherein broadcasting each message in said step (e) comprises:
   (i) dividing the message converted in said step (d) into a plurality of packets;
   (ii) broadcasting the packets created in said step (i); and
   (iii) storing at least part of the message broadcasted in said step (ii) for further broadcasting.

19. A method of utilizing a server including a message portal for administering and controlling the exchange of messages between a remote location and a vehicle, comprising the steps of:
   (a) determining a plurality of message categories;
   (b) receiving from a user a designation of an importance value for each message category of the plurality of message categories;
   (c) visually displaying the importance values of the message categories in a bar graph;
   (d) receiving messages from the remote location;
   (e) determining as each message is received and in accordance with a priority algorithm comprising a weight portion and a time portion when each message received in said step (d) should be broadcast to a vehicle, wherein the weight portion depends on the importance value of the each message, and wherein the priority algorithm calculates a sending priority for each message as:

Sending Priority=$a$*WEIGHT+$b$*(Now−NextScheduledTime), where
      a=a weight scalar,
      b=a time scalar,
      (Now−NextScheduledTime)=an overdue point duration, and WEIGHT=(Category*ServiceLevel)+$a'$*(1−CurrentSaturation)+$b'$*Bellcurve(CurrentDate, ActivationDate, $c$), where
      Category=an assigned value of relative category importance,
      ServiceLevel=an assigned value of relative service criticality,
      $a'$=a saturation scalar,
      CurrentSaturation=a number of cars on a road at a given interval,
      $b'$=activation date scalar,
      CurrentDate=a current date,
      ActivationDate=an activation date, and
      $c$=a days out factor;
   (f) prioritizing each of the messages according to the determination in said step (e);
   (g) converting the messages into a format readable by the vehicle; and
   (h) broadcasting each message converted in said step (g) to the vehicle via a one-to-many communication network and according to the priority set in said step (f).

20. The method as recited in claim 19, wherein the importance values range from a first value signifying an unimportant message category to a second value of signifying an important message category.

21. The method as recited in claim 20, wherein the first value is 0 and the second value is 120.

22. The method as recited in claim 19, wherein a first message category of the plurality of message categories comprises a general message and a second message category of the plurality of message categories comprises a recall message associated with the vehicle, and wherein a first importance value associated with the first message category is less than a second importance value associated with the second message category.

* * * * *